United States Patent
Kawasaki et al.

(10) Patent No.: US 11,815,175 B2
(45) Date of Patent: Nov. 14, 2023

(54) CONTROL DEVICE AND CONTROL METHOD OF ELECTRIC VEHICLE

(71) Applicant: TOYOTA JIDOSHA KABUSHIKI KAISHA, Toyota (JP)

(72) Inventors: Daijiro Kawasaki, Susono (JP);
Satoshi Yamanaka, Gotemba (JP);
Hideaki Otsubo, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 347 days.

(21) Appl. No.: 15/929,213

(22) Filed: Jan. 30, 2020

(65) Prior Publication Data

US 2020/0292062 A1 Sep. 17, 2020

(30) Foreign Application Priority Data

Mar. 11, 2019 (JP) .................. 2019-043896

(51) Int. Cl.
*F16H 59/10* (2006.01)
*F16H 63/50* (2006.01)
(Continued)

(52) U.S. Cl.
CPC ........... *F16H 59/105* (2013.01); *B60K 20/02* (2013.01); *B60L 15/2009* (2013.01); *B60W 10/08* (2013.01); *B60W 10/18* (2013.01); *F16H 61/24* (2013.01); *F16H 63/50* (2013.01); *B60L 2260/26* (2013.01)

(58) Field of Classification Search
CPC ........ F16H 59/105; F16H 61/24; F16H 63/50; F16H 2063/506; B60K 20/02; B60L 15/2009; B60L 15/2054; B60L 15/2063; B60L 15/20; B60L 2250/12; B60L 2240/423; B60L 2240/40; B60L 2220/40; B60W 10/08; B60W 10/18; B60W 2710/083; B60W 30/19; B60W 30/18181;
(Continued)

(56) References Cited

U.S. PATENT DOCUMENTS 4,949,119 A * 8/1990 Moncrief .................. G09B 9/05
702/42
5,277,584 A * 1/1994 DeGroat ................... G09B 9/04
600/587
(Continued)

FOREIGN PATENT DOCUMENTS

| CN | 101771381 A | 7/2010 |
|---|---|---|
| CN | 108136932 A | 6/2018 |

(Continued)

*Primary Examiner* — T. Scott Fix
(74) *Attorney, Agent, or Firm* — Oblon, McClelland, Maier & Neustadt, L.L.P.

(57) ABSTRACT

In a control device of an electric vehicle including a motor, driving wheels, a shifting device that is operated by a driver and selectively sets one of two shift positions of a traveling position that generates driving force by transmitting output torque of the motor to the driving wheels, and a non-traveling position that does not generate driving force without transmitting the output torque to the driving wheels, a controller causes the motor to output signal torque that enables the driver to sense a change in a vehicle behavior accompanied with switching of the shift position when the driver switches the shift position.

3 Claims, 18 Drawing Sheets

(51) Int. Cl.
  *B60K 20/02* (2006.01)
  *B60L 15/20* (2006.01)
  *B60W 10/08* (2006.01)
  *B60W 10/18* (2012.01)
  *F16H 61/24* (2006.01)

(58) Field of Classification Search
  CPC ... B60W 30/18063; B60Q 5/00; B60Q 5/005; B60Q 5/008
  USPC .............. 74/471 R; 180/53.2, 65.1; 381/71.4
  See application file for complete search history.

(56) References Cited

U.S. PATENT DOCUMENTS

| | | | | |
|---|---|---|---|---|
| 7,104,152 | B2 * | 9/2006 | Levin | F16H 61/24 74/471 XY |
| 9,150,153 | B2 * | 10/2015 | Konet | B60Q 5/008 |
| 2003/0188594 | A1 * | 10/2003 | Levin | F16H 61/24 74/473.12 |
| 2004/0204285 | A1 * | 10/2004 | Ueno | B60L 15/2009 477/4 |
| 2008/0060861 | A1 * | 3/2008 | Baur | B60K 1/00 180/65.6 |
| 2010/0134058 | A1 | 6/2010 | Nagashima et al. | |
| 2012/0067659 | A1 | 3/2012 | Ogura | |
| 2012/0126969 | A1 * | 5/2012 | Wilbur | B60Q 1/506 340/466 |
| 2012/0130580 | A1 * | 5/2012 | Omote | G10K 15/02 701/22 |
| 2012/0177214 | A1 * | 7/2012 | Hera | H04R 1/22 381/73.1 |
| 2012/0293313 | A1 * | 11/2012 | Yu | B60Q 9/008 340/425.5 |
| 2013/0066509 | A1 | 3/2013 | Nakamura et al. | |
| 2014/0121896 | A1 * | 5/2014 | Valeri | F02M 35/1294 701/36 |
| 2014/0195088 | A1 | 7/2014 | Schuessler | |
| 2014/0318293 | A1 * | 10/2014 | Nelson | F16H 59/0278 74/473.3 |
| 2018/0208077 | A1 | 7/2018 | Kato et al. | |
| 2020/0124165 | A1 * | 4/2020 | Lotz | F16H 61/0204 |
| 2021/0201885 | A1 * | 7/2021 | Bastyr | H04R 1/025 |
| 2022/0063494 | A1 * | 3/2022 | Duo' | B60L 7/18 |

FOREIGN PATENT DOCUMENTS

| | | | | |
|---|---|---|---|---|
| DE | 102008058668 | A1 * | 5/2010 | ......... B60L 15/2009 |
| DE | 102010043973 | A1 * | 5/2012 | ......... B60L 11/1803 |
| DE | 102017101303 | A1 * | 8/2017 | ............. B60L 15/02 |
| EP | 0585122 | A2 * | 3/1994 | ............. B60L 11/18 |
| EP | 3 360 725 | A1 | 8/2018 | |
| EP | 3630545 | B1 * | 1/2021 | ......... B60L 15/2045 |
| JP | 6-78416 | A | 3/1994 | |
| JP | 2001-103618 | A | 4/2001 | |
| JP | 2003-294123 | A | 10/2003 | |
| JP | 2005-130613 | A | 5/2005 | |
| JP | 2010252526 | A * | 11/2010 | |
| JP | 2011-250648 | A | 12/2011 | |
| JP | 2018-100724 | A | 6/2018 | |
| KR | 20140014717 | A * | 2/2014 | |
| KR | 20150066907 | A * | 6/2015 | |
| WO | WO-2011050274 | A1 * | 4/2011 | ............... B60Q 5/00 |

\* cited by examiner

CONTROL DEVICE AND CONTROL METHOD OF ELECTRIC VEHICLE

INCORPORATION BY REFERENCE

The disclosure of Japanese Patent Application No. 2019-043896 filed on Mar. 11, 2019 including the specification, drawings and abstract is incorporated herein by reference in its entirety.

BACKGROUND

1. Technical Field

The present disclosure relates to a control device and a control method of an electric vehicle that uses at least one motor as a driving force source, and starts and travels with an output torque from the motor.

2. Description of Related Art

Japanese Unexamined Patent Application Publication No. 2011-250648 (JP 2011-250648 A) describes a backlash reducing control device of an electric vehicle for the purpose of reducing backlash in a driving system from a motor to driving wheels. The electric vehicle described in JP 2011-250648 A travels by transmitting output torque from the motor to the driving wheels according to a shift position selected by a shift operation by a driver. In addition, the electric vehicle can execute so-called creep traveling at an extremely low speed by using minute output torque (creep torque) from the motor. Further, when a predetermined permission condition is met, a creeping-cut that makes the creep torque of the motor zero is performed. When the shift position selected during the execution of the creeping-cut is a traveling position, such as a drive (D) position and a reverse (R) position, the backlash reducing control device described in JP 2011-250648 A causes the motor to output minute torque (backlash reducing torque) in the same direction as the driving direction in the traveling position. As a result, the backlash in a driving system is reduced by the backlash reducing torque during the execution of the creeping-cut, such that occurrence of a gear rattling sound or a shock can be curbed at the time of restart of the creep traveling or at the time of normal start or acceleration after the end of the creeping-cut.

SUMMARY

As described above, the electric vehicle described in JP 2011-250648 A performs creep traveling using the small creep torque output from the motor. At the same time, for example, the creeping-cut that stops the output of the creep torque from the motor is performed in a braking state where a brake switch is turned on and in a stopped state where vehicle speed is less than or equal to a predetermined value. By performing such a creeping-cut, power consumption of the motor can be reduced. However, in a vehicle that performs the creeping-cut as described in JP 2011-250648 A, or a vehicle that originally does not output creep torque, the driver may feel uncomfortable or uneasy when shifting a shift position from a non-traveling position, such as a neutral (N) position and a parking (P) position, to the traveling position, such as the D position and the R position.

For example, in a conventional general vehicle that uses an engine as a driving force source and is equipped with an automatic transmission, the output torque of the engine is transmitted to driving wheels via a torque converter and the automatic transmission. Therefore, creep torque is always generated by acting of the torque converter while the engine is being operated. As such, when the driver shifts the shift position from the non-traveling position to the traveling position, creep torque that has been interrupted until then is transmitted to the driving wheels, resulting in fluctuations in driving force. The driver can sense the fluctuations in driving force and recognize that the shift position has been appropriately changed to the traveling position. On the other hand, in a vehicle that does not output creep torque or a vehicle that performs the creeping-cut as described above, the fluctuation in driving force due to creep torque as in the conventional case does not occur when the driver shifts the shift position from the non-traveling position to the traveling position. Therefore, the driver cannot sense that the traveling position has been set when shifting the shift position from the non-traveling position to the traveling position. For the above reason, for example, a driver who is accustomed to driving a conventional general vehicle that generates a creep torque may feel uncomfortable with no change in a behavior of the vehicle or uneasy about whether the shift position is being shifted correctly when shifting the shift position from the non-traveling position to the traveling position in the vehicle that does not output creep torque or the vehicle that performs the creeping-cut as described above.

The present disclosure provides a control device and a control method of an electric vehicle that enables a driver to appropriately perform a shift operation without feeling uncomfortable or uneasy even in an electric vehicle that does not output creep torque or an electric vehicle that performs the creeping-cut.

A first aspect of the present disclosure is a control device of an electric vehicle including a driving force source having at least one motor, driving wheels, a shifting device operated by a driver and configured to selectively set one of two shift positions of a traveling position that generates driving force by transmitting output torque of the driving force source to the driving wheels, and a non-traveling position that does not generate the driving force without transmitting the output torque to the driving wheels, and a sensor configured to detect the shift position set by the shifting device. The control device includes a controller configured to control the motor according to the shift position detected by the sensor. The controller is configured to cause the motor to output signal torque that enables the driver to sense a change in a vehicle behavior accompanied with switching of the shift position when the driver switches the shift position.

Further, in the first aspect, the signal torque may be the output torque of the motor that generates a vibration that the driver can sense while maintaining a stopped state or a traveling state of the electric vehicle.

In addition, in the first aspect, the controller may cause the motor to output the signal torque when the driver switches the shift position from the non-traveling position to the traveling position.

Moreover, in the first aspect, the controller may cause the motor to output the signal torque in the same direction as a rotational direction of a driving torque that drives the electric vehicle in the traveling position after the switching.

Further, in the first aspect, the controller may cause the motor to output the signal torque in the direction opposite to the rotational direction of the driving torque after causing the motor to output the signal torque in the same direction as the rotational direction of the driving torque.

In addition, in the first aspect, the sensor may detect acceleration of the electric vehicle. In the first aspect, the controller may cause the motor to output the signal torque that generates the acceleration larger than disturbance acceleration when the disturbance acceleration due to a disturbance applied to the electric vehicle occurs before the shift position is switched to the traveling position.

Moreover, the control device according to the first aspect may include a brake device configured to generate braking torque that brakes the electric vehicle. In the first aspect, the controller may control the brake device and cause the brake device to generate the braking torque larger than the signal torque when causing the motor to output the signal torque while the electric vehicle is in a stopped state.

Further, in the first aspect, the controller may cause the motor to output the signal torque when the driver switches the shift position from the traveling position to the non-traveling position.

Moreover, in the first aspect, the controller may cause the motor to output the signal torque in the same direction as the rotational direction of the driving torque that drives the electric vehicle in the traveling position after the driver switches the shift position between the traveling position for moving the electric vehicle forward and the traveling position for moving the electric vehicle backward.

In addition, in the first aspect, the controller may cause the motor to output the signal torque in the direction opposite to the rotational direction of a driving torque after causing the motor to output the signal torque in the same direction as the rotational direction of the driving torque.

Further, in the first aspect, the sensor may detect the time when the motor outputs the signal torque. In the first aspect, the controller may end an output of the signal torque when a predetermined time elapses after the output of the signal torque is started.

In the first aspect, the sensor may detect the acceleration of the electric vehicle. In the first aspect, the controller may end an output of the signal torque when the acceleration larger than or equal to a predetermined acceleration occurs after the output of the signal torque is started.

In the control device of the electric vehicle according to the first aspect, the signal torque is output to enable the driver to sense that the shift position has been switched when the driver switches the shift position in an electric vehicle that does not output creep torque or an electric vehicle that performs the creeping-cut. The output torque of the motor is controlled so that the change in the vehicle behavior that the driver can sense via the signal torque is generated. In a general vehicle that transmits the output torque of an engine to driving wheels via a torque converter and an automatic transmission, creep torque is inevitably generated, and when the driver switches the shift position, a change in the vehicle behavior or a vibration due to creep torque is generated. Therefore, the driver recognizes that the shift position has been switched by sensing such a change in vehicle behavior. On the other hand, the change in the vehicle behavior due to creep torque does not occur when the driver switches the shift position in the electric vehicle that does not output creep torque or the electric vehicle that performs the creeping-cut. In other words, the change in the vehicle behavior accompanied with switching of the shift position does not occur. Conversely, with the control device of the electric vehicle according to the first aspect, it is possible to enable the driver to sense the change in the vehicle behavior using the signal torque output from the motor when the driver switches the shift position. For this reason, even in the electric vehicle that does not output creep torque or the electric vehicle that performs the creeping-cut, the driver can appropriately switch the shift position, feeling as if the driver is driving a conventional vehicle without feeling uncomfortable or uneasy.

Further, in the control device of the electric vehicle according to the first aspect, the signal torque is an output torque of the motor, which generates a vibration that the driver can sense in the electric vehicle without changing the traveling state or the stopped state of the electric vehicle. For example, when the driver switches the shift position while the electric vehicle is in the stopped state, the stopped state is maintained without starting the electric vehicle, and a vibration accompanied with switching of the shift position is generated. Alternatively, when the driver switches the shift position while the electric vehicle is in the traveling state, the traveling state is maintained without accelerating or decelerating of the electric vehicle, and a vibration accompanied with switching of the shift position is generated. Therefore, the driver appropriately and surely senses the vibration accompanied with switching of the shift position when the driver switches the shift position. For this reason, with the control device of the electric vehicle according to the first aspect, even in the electric vehicle that does not output creep torque or the electric vehicle that performs the creeping-cut, the driver can appropriately perform the shift operation, feeling as if the driver is driving a conventional vehicle without feeling uncomfortable or uneasy.

In addition, with the control device of the electric vehicle according to the first aspect, it is possible to enable the driver to sense the change in the vehicle behavior or the vibration using the output signal torque from the motor when the driver switches the shift position from the non-traveling position, such as the N position and the P position, to the traveling position, such as the D position and the R position. Therefore, when selecting the traveling position and starting the electric vehicle, the driver can appropriately switch the shift position, feeling as if the driver is driving a conventional vehicle without feeling uncomfortable or uneasy.

In addition, with the control device of the electric vehicle according to the first aspect, the signal torque as described above is output from the motor when the driver switches the shift position from the non-traveling position, such as the N position and the P position, to the traveling position, such as the D position and the R position. In this case, the motor is controlled such that the motor outputs the signal torque in the same direction as the rotational direction of the driving torque that causes the electric vehicle to travel. For example, when the shift position is switched to the D position, a signal torque in the rotational direction that moves the electric vehicle forward is output. When the shift position is switched to the R position, a signal torque in the rotational direction that moves the electric vehicle backward is output. As such, the driver can sense and recognize the future traveling direction when selecting the traveling position and causing the electric vehicle to travel. Therefore, the driver can appropriately switch the shift position, feeling closer to driving a conventional vehicle without feeling uncomfortable or uneasy.

In addition, similar to the "signal torque", the "backlash reducing torque" in the backlash reducing control device of the electric vehicle described in the above-mentioned JP 2011-250648 A is torque in the same direction as the rotational direction of the driving torque that causes the electric vehicle to travel. However, "backlash reducing torque" described in JP 2011-250648 A is torque that prevents the driver from sensing a shock or a vibration by reducing backlash in a transmission system whereas the "signal torque" in the aspect of the present disclosure is torque that enables the driver to sense the change in the vehicle behavior or the vibration. For this reason, the "backlash reducing torque" described in JP 2011-250648 A is extremely small torque for reducing backlash in the transmission system without generating a shock. In other words, the "backlash reducing torque" described in JP 2011-250648 A is the torque for preventing the change in the vehicle behavior or the vibration of the vehicle that the driver can sense from occurring. On the other hand, the "signal torque" in the first aspect is the torque for generating the change in the vehicle behavior or the vibration that the driver can sense within a range in which the traveling state or the stopped state of the electric vehicle is not changed, and is relatively large torque. Therefore, the "signal torque" in the first aspect is different from the "backlash reducing torque" described in JP 2011-250648 A in terms of nature and magnitude, and the like.

In addition, with the control device of the electric vehicle according to the first aspect, as described above, when the driver switches the shift position from the non-traveling position to the traveling position, the signal torque in the rotational direction that is the same as the traveling direction of the electric vehicle may be output, as described above, and then the signal torque in the rotational direction opposite to the traveling direction of the electric vehicle may be output. As such, the output signal torque in this case becomes a so-called alternating load, enabling the driver to easily sense the change in the vehicle behavior or the vibration generated by such signal torque. Therefore, the driver can surely sense and recognize the future traveling direction when selecting the traveling position and causing the electric vehicle to travel.

Further, with the control device of the electric vehicle according to the first aspect, in a case where a disturbance is applied to the electric vehicle, for example, when the electric vehicle is stopped on a vibrating bridge or is stopped by being exposed to a strong wind, signal torque that is larger than in the normal time without a disturbance may be output such that acceleration exceeding the disturbance acceleration occurring in the electric vehicle due to the disturbance is generated. As such, it is possible to enable the driver to surely sense the change in the vehicle behavior or the vibration using the output signal torque from the motor even in a case where the above-described disturbance occurs when the driver switches the shift position.

Moreover, with the control device of the electric vehicle according to the first aspect, when the signal torque is output from the motor, the brake device may be controlled such that the brake device generates braking torque exceeding the signal torque. As such, when the signal torque for enabling the driver to sense that the shift position has been switched is output while the electric vehicle is stopped, the stopped state can be surely maintained by the braking force generated by the brake device. Therefore, it is possible to enable the driver to appropriately sense the change in the vehicle behavior or the vibration using the output signal torque from the motor.

In addition, with the control device of the electric vehicle according to the first aspect, when the driver switches the shift position from the traveling position, such as the D position and the R position, to the non-traveling position, such as the N position and the P position, it is possible to enable the driver to sense the change in the vehicle behavior or the vibrations using the output signal torque from the motor. As such, when the driver selects, for example, the N position during traveling to cause the electric vehicle to coast, the driver can sense and recognize that the shift position has been switched from the traveling position to the N position. Therefore, it is possible for the driver to appropriately switch the shift position, feeling as if the driver is driving a conventional vehicle.

In addition, with the control device of the electric vehicle according to the first aspect, when the driver switches the shift position between, for example, the traveling position for moving the electric vehicle forward, such as the D position and a brake (B) position, and the traveling position for moving the electric vehicle backward, such as the R position, it is possible to enable the driver to sense the change in the vehicle behavior or the vibrations using the output signal torque from the motor. In this case, the motor is controlled such that the motor outputs the signal torque in the same direction as the rotational direction of the driving torque that causes the electric vehicle to travel. For example, when the shift position is switched to the D position, the signal torque in the rotational direction that moves the electric vehicle forward is output. When the shift position is switched to the R position, the signal torque in the rotational direction that moves the electric vehicle backward is output. As such, the driver can sense and recognize the future traveling direction when selecting the traveling position and causing the electric vehicle to travel. Therefore, the driver can appropriately switch the shift position, feeling closer to driving a conventional vehicle without feeling uncomfortable or uneasy.

In addition, with the control device of the electric vehicle according to the first aspect, as described above, when the driver switches the shift position, for example, between the D position and the R position, the signal torque in the rotational direction, that is, the same as the traveling direction of the electric vehicle may be output, as described above, and then the signal torque in the rotational direction opposite to the traveling direction of the electric vehicle may be output. As such, the output signal torque in this case becomes the so-called alternating load, enabling the driver to easily sense the change in the vehicle behavior or the vibration generated by such signal torque. Therefore, the driver can surely sense and recognize the future traveling direction when selecting the traveling position and causing the electric vehicle to travel.

Moreover, with the control device of the electric vehicle according to the first aspect, it is possible to cause the motor to output the above-described signal torque only for a predetermined time period. The predetermined time in this case may be set in advance as, for example, the shortest time in which the driver can sense the change in the vehicle behavior or the vibration generated by the signal torque. Therefore, it is possible to reduce the power consumption of the motor when outputting the signal torque, thereby improving energy efficiency of the electric vehicle.

With the control device of the electric vehicle according to the first aspect, it is possible to set in advance, as a threshold value, the minimum acceleration at which the driver can sense the change in the vehicle behavior and the vibration generated by the signal torque, and end the output of the signal torque from the motor when the acceleration generated by the signal torque exceeds the threshold value. With the control device of the electric vehicle according to the first aspect, it is possible to cause the motor to output the above-described signal torque only in the necessary minimum magnitude and period. Therefore, it is possible to reduce the power consumption of the motor when outputting the signal torque, thereby improving energy efficiency of the electric vehicle.

A second aspect of the present disclosure is a control method of an electric vehicle including a driving force source having at least one motor, driving wheels, a shifting device operated by a driver and configured to selectively set one of two shift positions of a traveling position that generates driving force by transmitting output torque of the driving force source to the driving wheels, and a non-traveling position that does not generate driving force without transmitting the output torque to the driving wheels, a sensor configured to detect the shift position set by the shifting device, and a controller configured to control the motor according to the shift position detected by the sensor. The control method includes a step of causing the motor to output signal torque that enables the driver to sense a change in a vehicle behavior accompanied with switching of the shift position when the driver switches the shift position.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the present disclosure will be described with reference to drawings. In addition, the embodiments described below are merely examples when the present disclosure is embodied, and does not limit the present disclosure.

The vehicle to be controlled in the embodiment of the present disclosure is an electric vehicle having at least one motor as a driving force source. The vehicle may be an electric vehicle equipped with one or a plurality of motors as a driving force source. Alternatively, the vehicle may be a so-called hybrid vehicle equipped with an engine and a motor as a driving force source. Regardless of whether the vehicle is an electric vehicle or a hybrid vehicle, output torque from the motor, which is the driving force source, is transmitted to the driving wheels and generates driving force. Moreover, the electric vehicle to be controlled in the embodiment of the present disclosure includes a shifting device operated by a driver. The shifting device selectively sets one of two shift positions of a traveling position that generates driving force by transmitting output torque of the driving force source to the driving wheels, and a non-traveling position that does not generate driving force without transmitting the output torque to the driving wheels. The control device of the electric vehicle according to the embodiment of the present disclosure controls the above-described electric vehicle, and is configured to cause the motor to temporarily output signal torque for enabling the driver to sense a change in a vehicle behavior accompanied with switching of the shift position without changing a traveling state or a stopped state of the electric vehicle when the driver operates the shifting device to switch the shift position.

Figure 1:
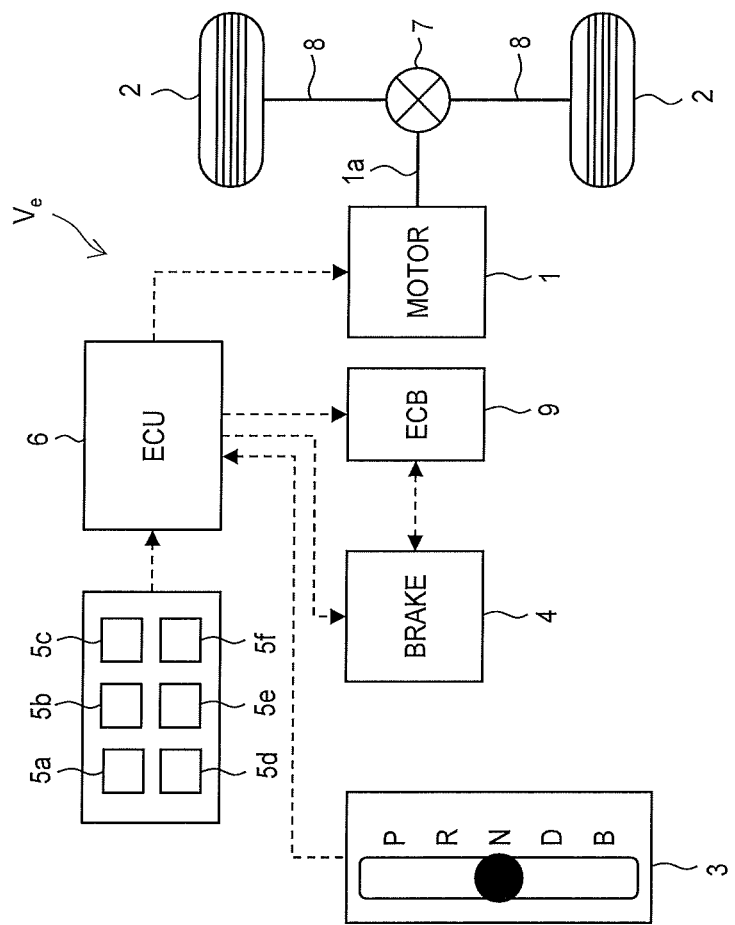
FIG. 1 is a diagram illustrating an example of a configuration (a driving system and a control system) of an electric vehicle in the present disclosure.

FIG. 1 illustrates an example of a driving system and a control system of the electric vehicle to be controlled in the present disclosure. The electric vehicle (hereinafter, vehicle) $V_e$ illustrated in FIG. 1 is an electric vehicle equipped with a motor 1 as a driving force source. The vehicle $V_e$ includes driving wheels 2, a shifting device 3, a brake device 4, a sensor 5, and a controller (ECU) 6 as main components. As described above, the driving force source in the embodiment of the present disclosure may include a plurality of motors of the motor 1 and other motors (not shown). Moreover, the driving force source may include the motor 1 and an engine (not shown). Alternatively, the driving force source may be a hybrid driving unit including the motor 1 and the engine (not shown), and a transmission (not shown), such as a power split device and a shifter.

The motor 1 is constituted with, for example, a permanent magnet-type synchronous motor, an induction motor, or the like, and is connected to the driving wheels 2 so as to transmit power. The motor 1 has at least a function as a prime mover that is driven by supply of power and outputs torque. Moreover, the motor 1 may function as a generator that is driven by receiving torque from the outside and generates power. In other words, the motor 1 may be a so-called motor generator that functions as both the prime mover and the generator. A battery (not shown) is connected to the motor 1 via an inverter (not shown). Therefore, the power stored in the battery is supplied to the motor 1 to cause the motor 1 to function as the prime mover, so that the motor 1 can output the driving torque. Moreover, the motor 1 functions as a generator by using the torque transmitted from the driving wheels 2 so that the regenerative power generated at this time can be stored in the battery. The number of output revolutions or output torque of the motor 1 is electrically controlled by the controller 6 to be described below. In addition, in a case of the motor generator, switching between the function as the prime mover and the function as the generator is electrically controlled.

The driving wheels 2 generate driving force of the vehicle $V_e$ by transmission of the driving torque output from the driving force source, that is, in the example illustrated in FIG. 1, transmission of the output torque from the motor. In the example illustrated in FIG. 1, the driving wheels 2 are connected to an output shaft 1a of the motor 1 via a differential gear 7 and a driving shaft 8. The vehicle $V_e$ may be a rear-wheel driving vehicle that generates driving force by transmitting driving torque (output torque of the motor 1) to the rear-wheel. In addition, the vehicle $V_e$ in the embodiment of the present disclosure may be a front-wheel driving vehicle that generates driving force by transmitting driving torque to the front wheel. Alternatively, the vehicle $V_e$ may be a four-wheel driving vehicle that generates driving force by transmitting driving torque to both the front-wheel and the rear-wheel.

Moreover, although not shown in FIG. 1, the vehicle $V_e$ in the embodiment of the present disclosure may include a given speed change mechanism or a speed reduction mechanism between the driving force source and the driving wheels 2. For example, an automatic transmission may be provided on the output side of the motor 1 to increase or decrease the output torque of the motor 1 and transmit it to the driving wheels 2 side. In addition, although not shown in FIG. 1, the vehicle $V_e$ in the embodiment of the present disclosure may include a starting clutch, as a starting device that replaces the torque converter, between the driving force source and the driving wheels 2. For example, when the vehicle $V_e$ is a hybrid vehicle equipped with an engine together with the motor 1 as a driving force source, a starting clutch may be provided between the engine and the driving wheels 2. In this case, the starting clutch is, for example, a friction clutch capable of continuously changing the transmission torque capacity. Therefore, when the output torque from the engine is transmitted to the driving wheels 2, the transmission torque capacity is continuously changed by controlling an engagement state of the starting clutch so that power can be smoothly transmitted or the vehicle $V_e$ can be smoothly started.

The shifting device 3 includes, for example, a gear shift lever (not shown) and a gear shift paddle (not shown), and is operated by the driver. The shifting device 3 selectively sets one of shift positions, which are roughly classified into two, that is, the traveling position and the non-traveling position. The traveling position is a shift position that generates driving force by transmitting output torque of the driving force source to the driving wheels 2. Examples of the traveling position include a drive (D) position that causes the vehicle $V_e$ to travel forward, a reverse (R) position that causes the vehicle $V_e$ to travel backward, and a brake (B) position that sets a gear ratio larger than the D position in the automatic transmission as described above. On the other hand, the non-traveling position is a shift position that does not generate driving force without transmitting the output torque to the driving wheels 2. Examples of the non-traveling position include a neutral (N) position and a parking (P) position. In the N position, for example, the motor 1 is controlled such that the output torque of the motor 1 becomes zero, and the vehicle $V_e$ is not driven. Alternatively, the above-described automatic transmission is set to neutral, and power transmission between the driving force source and the driving wheels 2 is interrupted. Alternatively, the above-described starting clutch turns to a released state, and power transmission between the driving force source and the driving wheels 2 is interrupted. Further, in the P position, in addition to the state in the N position as described above, a parking brake, a parking lock mechanism, and the like are operated to lock the rotation of the driving wheels 2.

The brake device 4 generates braking force for the vehicle $V_e$, and has a conventional general configuration, such as a hydraulic disc brake and a drum brake. The brake device 4 is operated, for example, when a driver depresses a brake pedal (not shown), and generates braking force (braking torque) for the vehicle $V_e$. Further, the vehicle $V_e$ in the embodiment of the present disclosure includes an electronically controlled brake system (ECB) 9 that optimally controls braking force according to the traveling state or the vehicle behavior. Therefore, the operation of the brake device 4 is controlled by the controller 6 to generate braking force.

The sensor 5 collectively refers to various sensors, equipment, devices, systems, and the like, that acquire various pieces of data or information necessary for controlling the vehicle $V_e$. In particular, the sensor 5 in the embodiment of the present disclosure detects data for appropriately controlling output of the signal torque from the motor 1 when the driver switches the shift position of the shifting device 3 to be described below. For this purpose, the sensor 5 has at least a shift position sensor 5a that detects a shift position set at the shifting device 3. In addition, the sensor 5 include various sensors, such as an accelerator position sensor 5b that detects an operation state (an operation amount, an accelerator opening degree, or the like) of an accelerator pedal (not shown) by the driver, a vehicle speed sensor (or a wheel speed sensor) 5c that detects vehicle speed of the vehicle $V_e$, a motor revolution number sensor (or a resolver) 5d that detects the number of revolutions of the motor 1, a motor current sensor 5e that detects an input current of the motor 1, and an acceleration sensor 5f that detects acceleration of the vehicle $V_e$. Moreover, the sensor 5 includes various sensors that operate along with the above-mentioned electronically controlled brake system 9. Further, the sensor 5 is electrically connected to the controller 6 to be described below, and outputs, to the controller 6, an electric signal according to a detected value or a calculated value of the above-described various sensors, equipment, systems, or the like, as detected data.

The controller 6 is an electronic control device having, for example, a microcomputer as a main component. In the example illustrated in FIG. 1, the controller 6 mainly controls each of the motor 1, the brake device 4, the electronic control brake system 9, and the like. Further, in a case where the vehicle $V_e$ includes the automatic transmission, the starting clutch, and the like, the controller 6 controls each of the automatic transmission and the starting clutch. Various pieces of data detected or calculated by the sensor 5 are input to the controller 6. The controller 6 performs calculation using various pieces of input data, and data, calculation formulas, or the like, stored in advance. The controller 6 is configured to output the calculation result as a control command signal and control the operation of each of the motor 1, the brake device 4, and the like, as described above. Although FIG. 1 illustrates an example in which one controller 6 is provided, a plurality of controllers 6 may be provided for each device or equipment to be controlled, or for each control content.

As described above, the vehicle $V_e$ to be controlled in the embodiment of the present disclosure is an electric vehicle that uses the motor 1 as a driving force source, and does not have, for example, a torque converter as in a conventional general vehicle that transmits the output torque of the engine to the driving wheels via the automatic transmission. Therefore, the vehicle $V_e$ does not generate creep torque as in the conventional vehicle equipped with a torque converter. Although it is possible to generate a pseudo creep torque using the output torque from the motor 1, a creeping-cut may also be performed to reduce power consumption, as disclosed, for example, in the above-mentioned JP 2011-250648 A. As mentioned above, the change in the vehicle behavior or the vibration due to creep torque does not occur when the driver switches the shift position in the conventional electric vehicle that does not output creep torque or the electric vehicle that performs the creeping-cut. Therefore, some drivers who are accustomed to driving a conventional vehicle that generates creep torque may feel uncomfortable or uneasy when the driver switches the shift position. For this reason, the control device of the electric vehicle according to the embodiment of the present disclosure is configured to cause the motor 1 to output the signal torque that generates the change in the vehicle behavior accompanied with switching of the shift position when the driver switches the shift position of the shifting device 3. For this purpose, a detailed example of the control performed by the controller 6 of the vehicle $V_e$ will be described below.

First Embodiment

Figure 2:
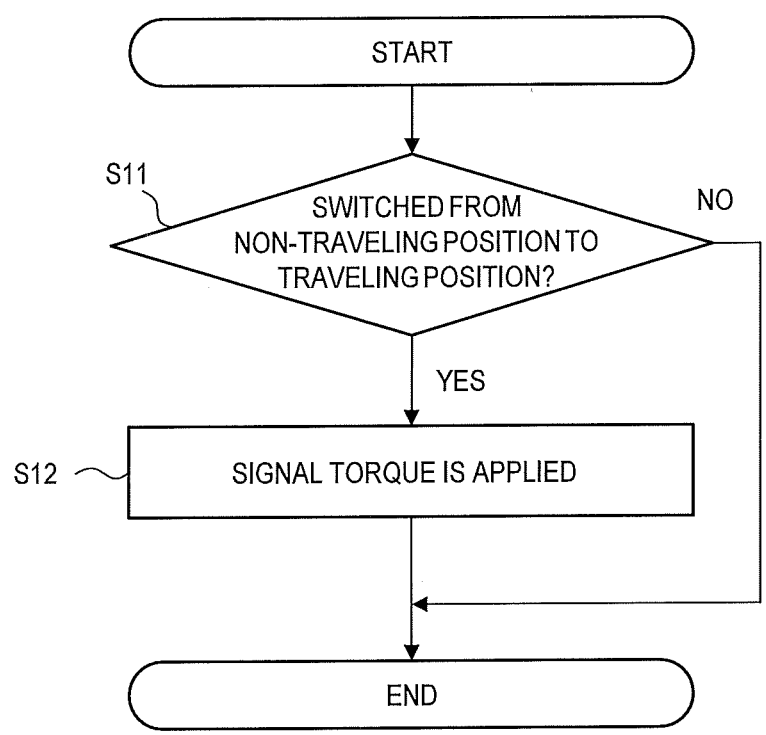
FIG. 2 is a flowchart for describing an example (a first embodiment) of control performed by a controller of the electric vehicle according to the present disclosure.
Figure 3:
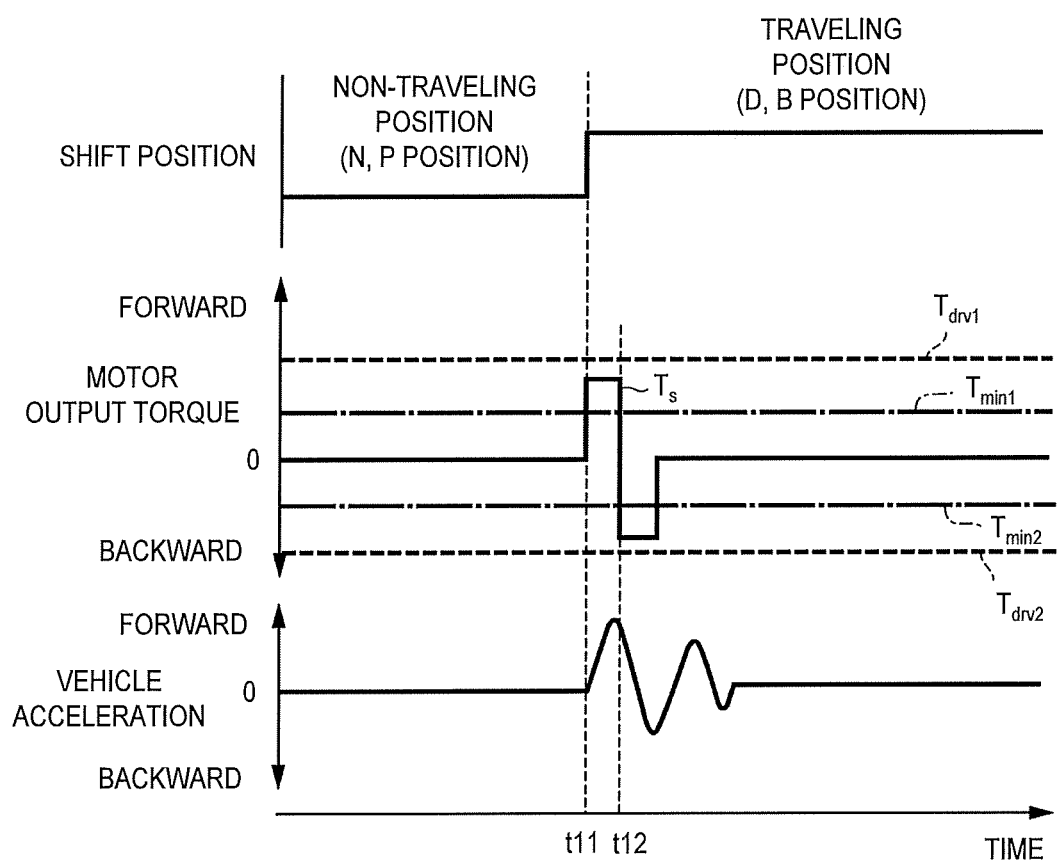
FIG. 3 illustrates time charts for describing a behavior of the vehicle when the control according to the first embodiment illustrated in the flowchart of FIG. 2 is performed.

A flowchart of FIG. 2 and time charts of FIG. 3 illustrate a first embodiment of the control performed by the controller 6. In the flowchart of FIG. 2 in the first embodiment, first, in step S11, it is determined whether the shift position of the shifting device 3 has been switched from the non-traveling position to the traveling position by the driver. For example, it is determined whether the shift position has been switched from the N position to the D position, the B position, or the R position. Alternatively, it is determined whether the shift position has been switched from the P position to the D position, the B position, or the R position.

When the determination at step S11 is negative because the shift position has not yet been switched from the non-traveling position to the traveling position, a routine illustrated in the flowchart of FIG. 2 ends without performing the subsequent control. Conversely, when the determination in step S11 is affirmative because the shift position has been switched from the non-traveling position to the traveling position, the process proceeds to step S12.

In step S12, the signal torque is applied. Specifically, the motor 1 is controlled such that the motor 1 outputs driving torque as the signal torque. For example, as illustrated in the time charts of FIG. 3, when the shift position is switched from the non-traveling position to the traveling position at time t11, the signal torque $T_s$ is output from the motor 1 in conjunction therewith. In the example illustrated in FIG. 3, the shift position is switched from the non-traveling position to the traveling position in the forward direction, which is the D position or the B position. Both the D position and the B position are traveling positions that cause the vehicle $V_e$ to travel in the forward direction. Therefore, in this case, first, the signal torque $T_s$ in the same direction as the rotational direction of the driving torque that causes the vehicle $V_e$ to travel in the forward direction is output. The signal torque $T_s$ in the rotational direction that causes the vehicle $V_e$ to travel in the forward direction is output so that acceleration in the direction of accelerating the vehicle $V_e$ in the forward direction is generated. The change in the acceleration in this case becomes the change in the vehicle behavior or the vibration accompanied with switching of the shift position so that the driver senses such change in the vehicle behavior or the vibrations when the shift position is switched as described above.

Hereinafter, in the time charts used to describe the embodiments of the present disclosure, the "motor output torque" on the vertical axis indicates that the driving torque in the rotational direction that causes the vehicle $V_e$ to travel in the forward direction is increased as the motor output torque moves upward from a starting point of zero, and the driving torque in the rotational direction that causes the vehicle $V_e$ to travel in the backward direction is increased as the motor output torque moves downward from the starting point of zero. Further, the "vehicle acceleration" on the vertical axis indicates that the acceleration in the direction of accelerating the vehicle $V_e$ in the forward direction is increased as the vehicle $V_e$ moves upward from the starting point of zero, and the acceleration in the direction of accelerating the vehicle $V_e$ in the backward direction is increased as the vehicle $V_e$ moves downward from the starting point of zero.

As illustrated in the time charts of FIG. 3, the signal torque $T_s$ is smaller than torque $T_{drv1}$ required for the vehicle $V_e$ to start to move in the forward direction, and larger than the minimum torque $T_{min1}$ at which the driver can recognize the change in the vehicle behavior. In other words, the signal torque $T_s$ generates the change in the vehicle behavior that the driver can sense without driving the vehicle $V_e$. Here, each of the torque $T_{drv1}$ and the torque $T_{min1}$ is set in advance based on, for example, the results of a traveling experiment or a simulation. Alternatively, the torque $T_{drv1}$ and the torque $T_{min1}$ may be set in real time as appropriate values according to the situation based on the result of calculating a situation in which the vehicle $V_e$ is stopped from various pieces of data detected by the sensor 5. Both the torque $T_{drv1}$ and the torque $T_{min1}$ become different values depending on the level and the type of the vehicle $V_e$. Further, the torque $T_{min1}$ varies depending on the person who senses the change in the vehicle behavior due to the signal torque $T_s$. For example, the torque $T_{min1}$ is approximately a value within a range from several N·m to more than ten N·m.

In addition, as described below, when the shift position is switched from the non-traveling position to the R position, the signal torque $T_s$ in the same direction as the rotational direction of the driving torque that causes the vehicle $V_e$ to travel backward is output. In other words, in step S12 in the flowchart of FIG. 2, when the shift position is switched from the non-traveling position to the traveling position by the driver, first, the motor 1 is controlled such that the motor 1 outputs the signal torque $T_s$ in the same direction as the rotational direction of the driving torque that drives the vehicle $V_e$ at the traveling position.

Further, in the example illustrated in FIG. 3, after the signal torque $T_s$ in the same direction as the rotational direction of the driving torque that causes the vehicle $V_e$ to travel in the forward direction is output, a signal torque $T_s$ in the same direction as the rotational direction of the driving torque that causes the vehicle $V_e$ to travel in the backward direction is output at time t12. In other words, the motor 1 is controlled such that the motor 1 outputs the signal torque $T_s$ in the same direction as the rotational direction of the driving torque that drives the vehicle $V_e$ in the traveling position as described above, and then output the signal torque $T_s$ in the direction opposite to the rotational direction of the driving torque. As illustrated in the time charts of FIG. 3, in this case, the signal torque $T_s$ is smaller than torque $T_{drv2}$ required for the vehicle $V_e$ to start to move in the backward direction, and larger than the minimum torque $T_{min2}$ at which the driver can recognize the change in the vehicle behavior. In summary, the signal torque $T_s$ generates the change in the vehicle behavior that the driver can sense without driving the vehicle $V_e$. Therefore, similar to the torque $T_{drv1}$ and the torque $T_{min1}$, each of the torque $T_{drv2}$ and the torque $T_{min2}$ is set in advance based on, for example, the results of a traveling experiment or a simulation. Alternatively, the torque $T_{drv2}$ and the torque $T_{min2}$ may be set in real time as appropriate values according to the situation based on the result of calculating a situation in which the vehicle $V_e$ is stopped from various pieces of data detected by the sensor 5. Similar to the torque $T_{drv1}$ and the torque $T_{min1}$, both the torque $T_{drv2}$ and the torque $T_{min2}$ become different values depending on the level and the type of the vehicle $V_e$. Further, the torque $T_{min2}$ varies depending on the person who senses the change in the vehicle behavior due to the signal torque $T_s$. For example, similar to the torque $T_{min1}$, the torque $T_{min2}$ is approximately a value within a range from several N·m to more than ten N·m.

When the signal torque $T_s$ is output in step S12, the routine illustrated in the flowchart of FIG. 2 ends.

As described above, in the first embodiment, the signal torque $T_s$ is output from the motor 1 when the driver switches the shift position from the non-traveling position, such as the N position and the P position, to the traveling position, such as the D position and the R position in the vehicle $V_e$ that does not output creep torque or the vehicle $V_e$ that performs the creeping-cut. In this case, the motor 1 is controlled such that the motor 1 outputs the signal torque in the same direction as the rotational direction of the driving torque that causes the vehicle $V_e$ to travel. For example, when the shift position is switched to the D position, the signal torque in the rotational direction that moves the vehicle $V_e$ forward is output. As such, the driver can sense and recognize the future traveling direction when selecting the traveling position and causing the vehicle $V_e$ to travel. Therefore, the driver can appropriately switch the shift position, feeling closer to driving a conventional vehicle without feeling uncomfortable or uneasy.

In addition, when the driver switches the shift position from the non-traveling position to the traveling position, first, the signal torque $T_s$ in the rotational direction same as the traveling direction of the vehicle $V_e$ is output, and subsequently, the signal torque $T_s$ in the rotational direction opposite to the traveling direction of the vehicle $V_e$ is output. As such, the signal torque $T_s$ output in this case becomes a so-called alternating load, enabling the driver to easily sense the changes in the vehicle behavior or the vibration generated by such signal torque $T_s$. Therefore, the driver can surely sense and recognize the future traveling direction when selecting the traveling position and causing the vehicle $V_e$ to travel.

Moreover, the control described in the first embodiment may be performed in a state where the vehicle $V_e$ is traveling at a predetermined vehicle speed. In other words, the control may be performed when the driver switches the shift position from the non-traveling position to the traveling position during traveling of the vehicle $V_e$. However, in this case, when the signal torque $T_s$ is applied while the vehicle speed is higher than a certain level, the vehicle behavior may be disturbed. Therefore, the control may be performed as illustrated, for example, in the flowchart of FIG. 4. Moreover, in the flowchart of FIG. 4, the same step numbers as the flowchart of FIG. 2 are given to the same steps as the control content illustrated in the flowchart of FIG. 2.

Figure 4:
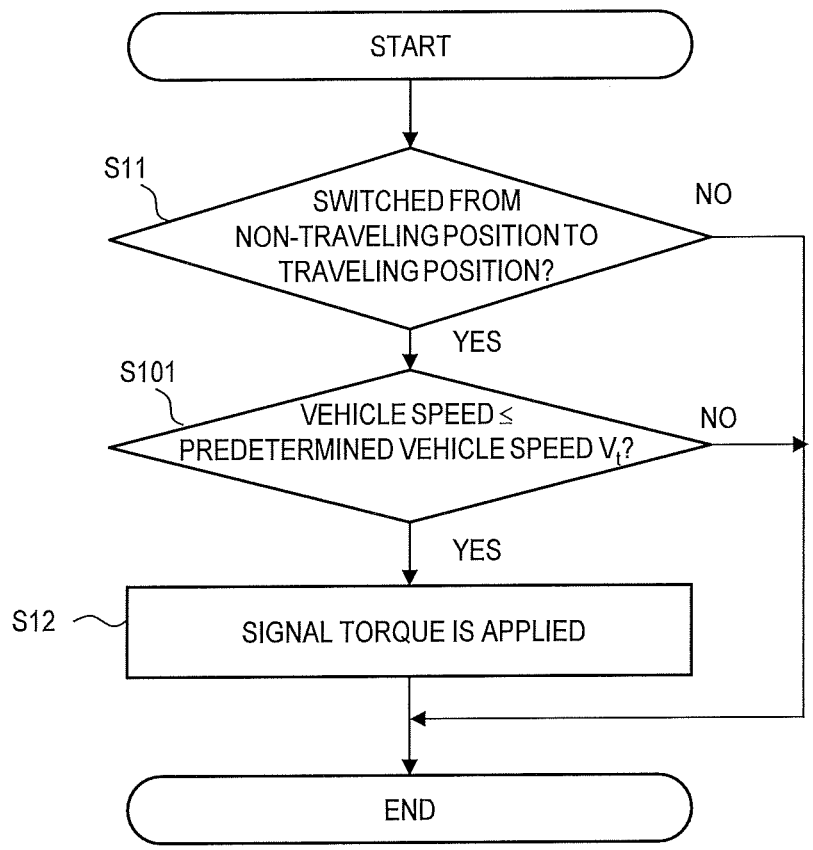
FIG. 4 is a flowchart for describing an example of derivative control according to the first embodiment illustrated in the flowchart of FIG. 2.

Specifically, in the flowchart of FIG. 4, when the determination in step S11 is affirmative because the shift position has been switched from the non-traveling position to the traveling position (the D position or the B position), the process proceeds to step S101.

In step S101, it is determined whether the vehicle speed is lower than or equal to a predetermined vehicle speed $V_t$. The predetermined vehicle speed $V_t$ is a threshold value for determining whether the vehicle behavior is disturbed when the signal torque $T_s$ is applied during traveling, as described above. The predetermined vehicle speed $V_t$ is set in advance based on, for example, the results of a traveling experiment or a simulation.

When the determination at step S101 is negative because the vehicle speed is higher than the predetermined vehicle speed $V_t$, the routine illustrated in the flowchart of FIG. 4 ends without performing the subsequent control. In other words, in this case, when the signal torque $T_s$ is applied during traveling, the vehicle behavior may be disturbed since the vehicle speed is high. Therefore, the control of applying the signal torque $T_s$ is not performed. Conversely, when the determination in step S101 is affirmative because the vehicle speed is lower than the predetermined vehicle speed $V_t$, the process proceeds to step S12. In step S12, in a manner similar to that in the first embodiment, the signal torque $T_s$ is applied.

As such, when the shift position is switched during traveling, it is possible to avoid occurrence of unnecessary disturbance in the vehicle behavior by determining whether to apply the signal torque $T_s$ in consideration of the vehicle speed at the time of switching of the shift position.

Second Embodiment

Figure 5:
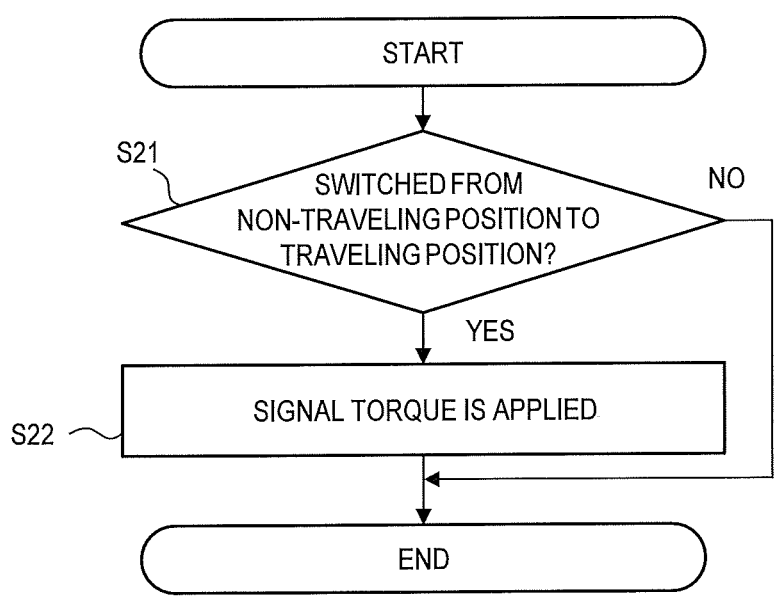
FIG. 5 is a flowchart for describing an example (a second embodiment) of control performed by the controller of the electric vehicle according to the present disclosure.
Figure 6:
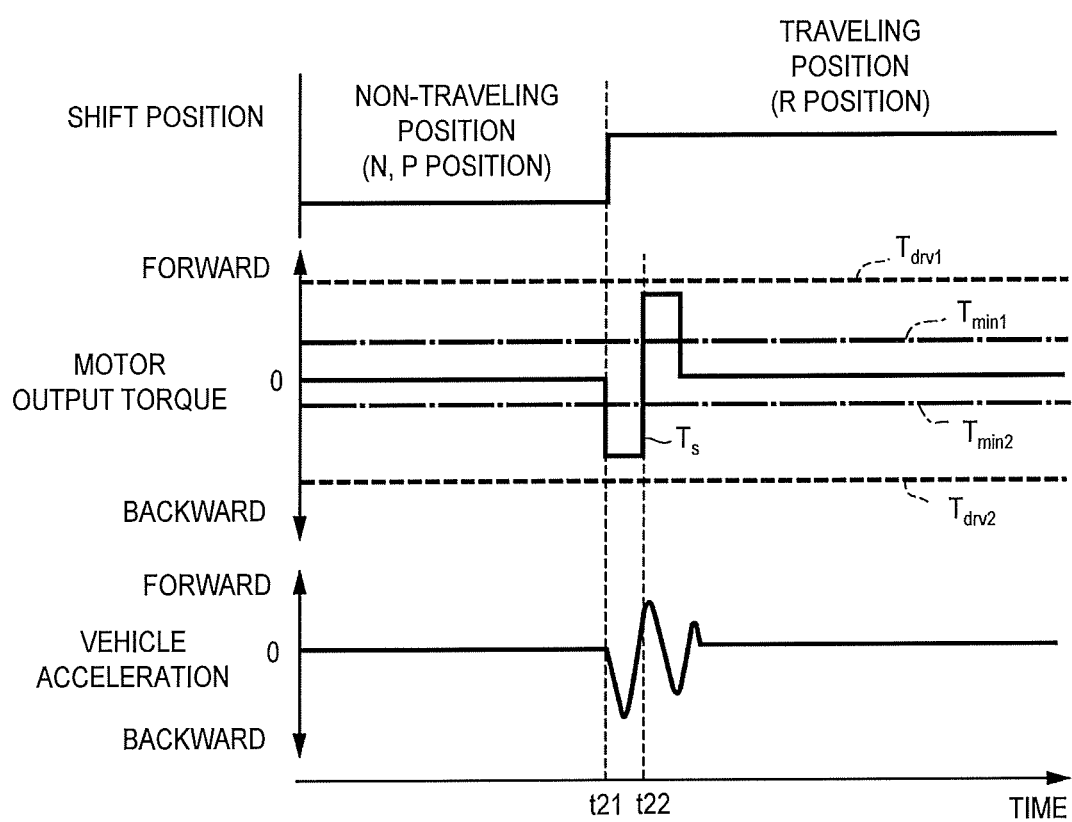
FIG. 6 illustrates time charts for describing a behavior of the vehicle when the control according to the second embodiment illustrated in the flowchart of FIG. 5 is performed.

A flowchart of FIG. 5 and time charts of FIG. 6 illustrate a second embodiment of the control performed by the controller 6. In the second embodiment, in the flowchart of FIG. 5, first, in step S21, it is determined whether the shift position of the shifting device 3 has been switched from the non-traveling position to the traveling position by the driver. In the second embodiment, it is determined whether the shift position has been switched from the non-traveling position to the R position.

When the determination in step S21 is negative because the shift position has not yet been switched from the non-traveling position to the traveling position (the R position), a routine illustrated in the flowchart of FIG. 5 ends without performing the subsequent control. Conversely, when the determination in step S21 is affirmative because the shift position has been switched from the non-traveling position to the traveling position (the R position), the process proceeds to step S22.

In step S22, the signal torque is applied. Specifically, the motor 1 is controlled such that the motor 1 outputs driving torque as the signal torque. In the second embodiment, as illustrated in the time charts of FIG. 6, when the shift position is switched from the non-traveling position to the R position at time t21, the signal torque $T_s$ is output from the motor 1 in conjunction therewith. In this case, first, the signal torque $T_s$ in the same direction as the rotational direction of the driving torque that causes the vehicle $V_e$ to travel in the backward direction is output. As a result, acceleration in the direction of accelerating the vehicle $V_e$ in the backward direction is generated. In this case, the change in the acceleration becomes the change in the vehicle behavior or the vibration accompanied with switching of the shift position so that the driver can sense the change in the vehicle behavior or the vibration according to the switched R position when switching the shift position from the non-traveling position to the R position, as described above. Therefore, the driver recognizes that the shift position has been switched to the R position and then the vehicle $V_e$ will travel in the backward direction.

As illustrated in the time charts of FIG. 6, the signal torque $T_s$ is smaller than the torque $T_{drv2}$ required for the vehicle $V_e$ to start to move in the backward direction, and larger than the minimum torque $T_{min2}$ at which the driver can recognize the change in the vehicle behavior. In other words, the signal torque $T_s$ generates the change in the vehicle behavior that the driver can sense while maintaining the stopped state of the vehicle $V_e$.

Further, in the example illustrated in FIG. 6, after the signal torque $T_s$ in the same direction as the rotational direction of the driving torque that causes the vehicle $V_e$ to travel in the backward direction is output, the signal torque $T_s$ in the same direction as the rotational direction of the driving torque that causes the vehicle $V_e$ to travel in the forward direction is output at time t22. In other words, the motor 1 is controlled such that the motor 1 outputs the signal torque $T_s$ in the same direction as the rotational direction of the driving torque that drives the vehicle $V_e$ in the traveling position (the R position) as described above, and then outputs the signal torque $T_s$ in the direction opposite to the rotational direction of the driving torque. As illustrated in the time charts of FIG. 6, in this case, the signal torque $T_s$ is smaller than torque $T_{drv1}$ required for the vehicle $V_e$ to start to move in the forward direction, and larger than the minimum torque $T_{min1}$ at which the driver can recognize the change in the vehicle behavior. In summary, the signal torque $T_s$ generates the change in the vehicle behavior that the driver can sense while maintaining the stopped state of the vehicle $V_e$.

When the signal torque $T_s$ is applied in step S22, the routine illustrated in the flowchart of FIG. 5 ends.

As described above, in the second embodiment, the signal torque $T_s$ is output from the motor 1 when the driver switches the shift position from the non-traveling position, such as the N position and the P position, to the R position. In this case, the motor 1 is controlled such that the motor 1 outputs the signal torque $T_s$ in the same direction as the rotational direction of the driving torque that causes the vehicle $V_e$ to travel. In other words, the signal torque $T_s$ in the rotational direction that moves the vehicle $V_e$ backward is output. As such, the driver can sense and recognize that the future traveling direction is in the backward direction when selecting the R position and causing the vehicle $V_e$ to travel. Therefore, the driver can appropriately switch the shift position, feeling closer to driving a conventional vehicle without feeling uncomfortable or uneasy.

Third Embodiment

Figure 7:
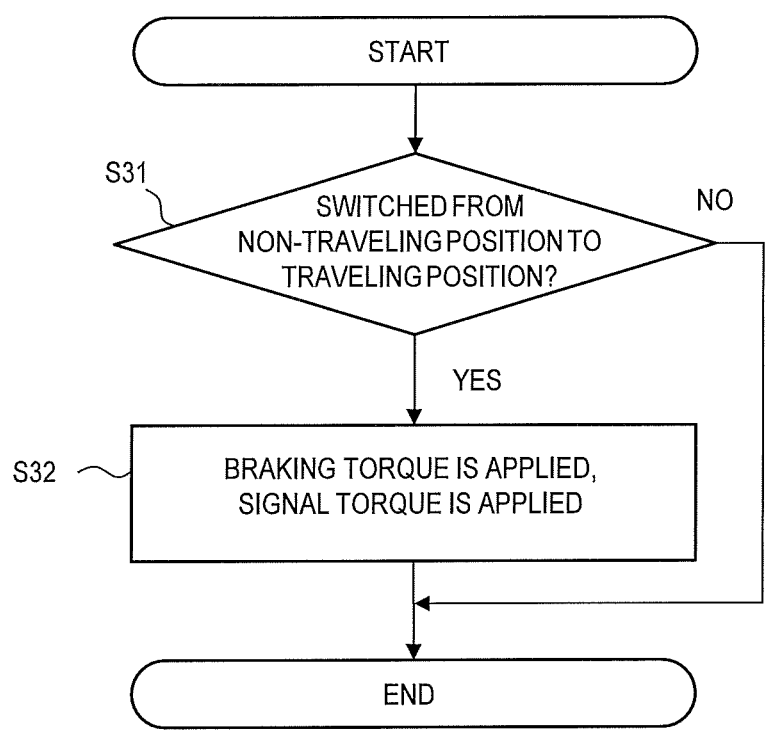
FIG. 7 is a flowchart for describing an example (a third embodiment) of control performed by the controller of the electric vehicle according to the present disclosure.
Figure 8:
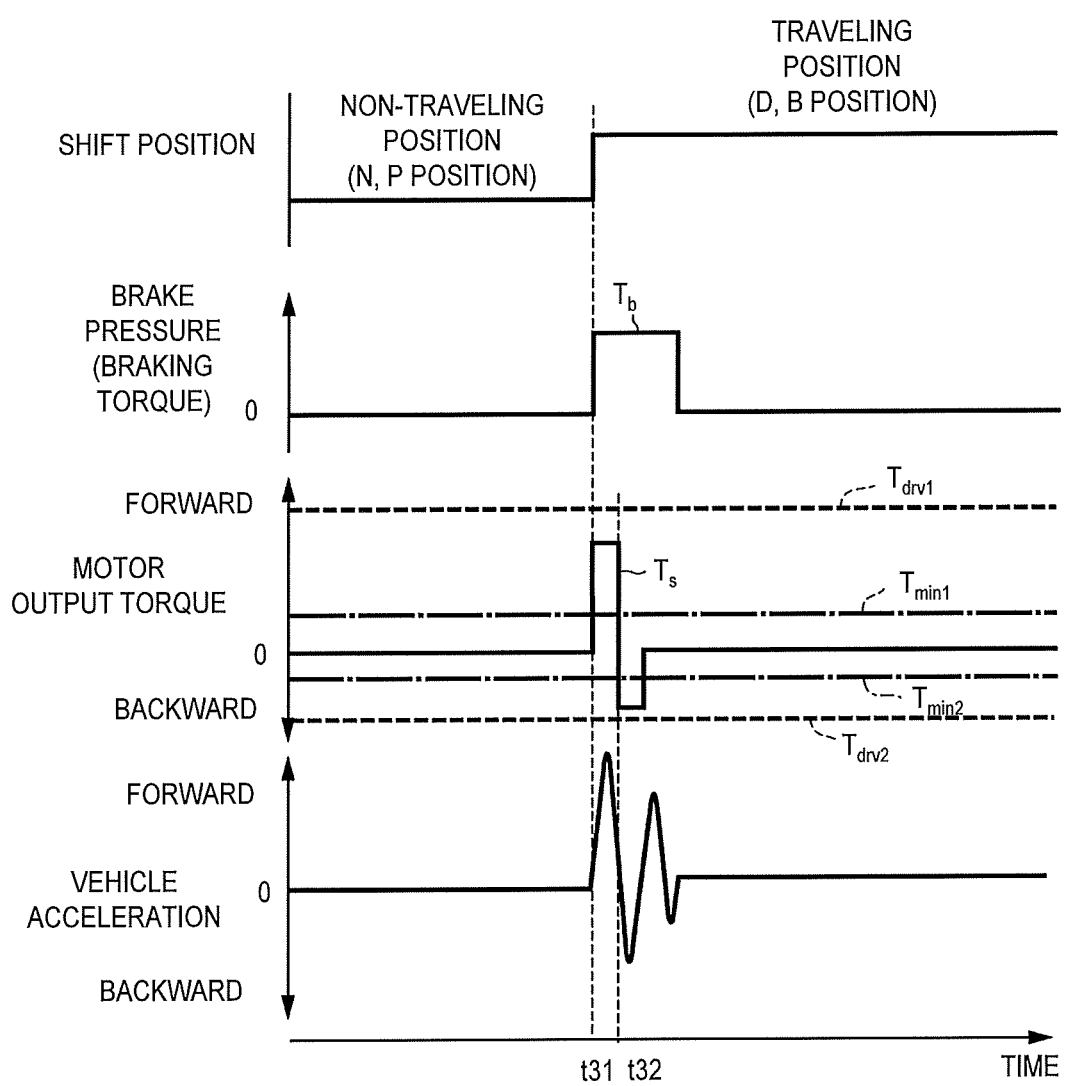
FIG. 8 illustrates time charts for describing a behavior of the vehicle when the control according to the third embodiment illustrated in the flowchart of FIG. 7 is performed.

A flowchart of FIG. 7 and time charts of FIG. 8 illustrate a third embodiment of the control performed by the controller 6. In the third embodiment, in the flowchart of FIG. 7, first, in step S31, it is determined whether the shift position of the shifting device 3 has been switched from the non-traveling position to the traveling position by the driver. For example, it is determined whether the shift position has been switched from the N position to the D position, the B position, or the R position. Alternatively, it is determined whether the shift position has been switched from the P position to the D position, the B position, or the R position.

When the determination in step S31 is negative because the shift position has not yet been switched from the non-traveling position to the traveling position, a routine illustrated in the flowchart of FIG. 7 ends without performing the subsequent control. Conversely, when the determination in step S31 is affirmative because the shift position has been switched from the non-traveling position to the traveling position, the process proceeds to step S32.

In step S32, the signal torque is applied. At the same time, the braking torque is applied. Specifically, the motor 1 is controlled such that the motor 1 outputs the driving torque as the signal torque. At the same time, the brake device 4 is controlled such that the brake device 4 generates braking force (braking torque). For example, as illustrated in the time charts of FIG. 8, when the shift position is switched from the non-traveling position to the traveling position at time t31, the signal torque $T_s$ is output from the motor 1 in conjunction therewith. In the example illustrated in FIG. 8, the shift position is switched from the non-traveling position to the traveling position in the forward direction, which is the D position or the B position. Therefore, in this case, first, the signal torque $T_s$ in the same direction as the rotational direction of the driving torque that causes the vehicle $V_e$ to travel in the forward direction is output. As a result, acceleration in the direction of accelerating the vehicle $V_e$ in the forward direction is generated. In this case, the change in the acceleration becomes the change in the vehicle behavior or the vibration accompanied with switching of the shift position so that the driver senses such change in the vehicle behavior or the vibration when the shift position is switched as described above.

In the third embodiment, along with the output of the signal torque $T_s$ at time t31 as described above, a brake device 4 is operated to generate braking torque $T_b$ (braking force). Specifically, the brake device 4 is operated by increasing brake pressure acting on the brake device 4 at time t31. The braking torque $T_b$ generated in this case has an absolute value larger than the signal torque $T_s$ output from the motor 1 while the vehicle $V_e$ is in the stopped state. Therefore, even when the signal torque $T_s$ is output as described above, it is possible to maintain the stopped state of the vehicle $V_e$ using the braking torque $T_b$ generated by the brake device 4.

As illustrated in the time charts of FIG. 8, the signal torque $T_s$ is smaller than the torque $T_{drv1}$ required for the vehicle $V_e$ to start to move in the forward direction, and larger than the minimum torque $T_{min1}$ at which the driver can recognize the change in the vehicle behavior. In other words, the signal torque $T_s$ generates the change in the vehicle behavior that the driver can sense while maintaining the stopped state of the vehicle $V_e$. The signal torque $T_s$ in the rotational direction that causes the vehicle $V_e$ to travel in the forward direction has an absolute value smaller than the braking torque $T_b$.

Further, in the example illustrated in FIG. 8, after the signal torque $T_s$ in the same direction as the rotational direction of the driving torque that causes the vehicle $V_e$ to travel in the forward direction is output, the signal torque $T_s$ in the same direction as the rotational direction of the driving torque that causes the vehicle $V_e$ to travel in the backward direction is output at time t32. In other words, the motor 1 is controlled such that the motor 1 outputs the signal torque $T_s$ in the same direction as the rotational direction of the driving torque that drives the vehicle $V_e$ in the traveling position as described above, and then outputs the signal torque $T_s$ in the direction opposite to the rotational direction of the driving torque. As illustrated in the time charts of FIG. 8, in this case, the signal torque $T_s$ is smaller than the torque $T_{drv2}$ required for the vehicle $V_e$ to start to move in the backward direction, and larger than the minimum torque $T_{min2}$ at which the driver can recognize the change in the vehicle behavior. In summary, the signal torque $T_s$ generates the change in the vehicle behavior that the driver can sense while maintaining the stopped state of the vehicle $V_e$. The signal torque $T_s$ in the rotational direction that causes the vehicle $V_e$ to travel in the backward direction also has an absolute value smaller than the braking torque $T_b$.

When the signal torque $T_s$ is applied in step S32, the routine illustrated in the flowchart of FIG. 7 ends.

As described above, in the third embodiment of the present disclosure, when the signal torque $T_s$ is output 1 from the motor, the brake device 4 is controlled such that the brake device 4 generates the braking torque $T_b$ exceeding the signal torque $T_s$. As such, when the signal torque $T_s$ for enabling the driver to sense that the shift position has been switched is output while the vehicle $V_e$ is in the stopped state, the stopped state can be surely maintained by the braking force generated by the brake device 4. Therefore, it is possible to enable the driver to appropriately sense the change in the vehicle behavior or the vibration using the signal torque $T_s$ output from the motor 1.

Fourth Embodiment

Figure 9:
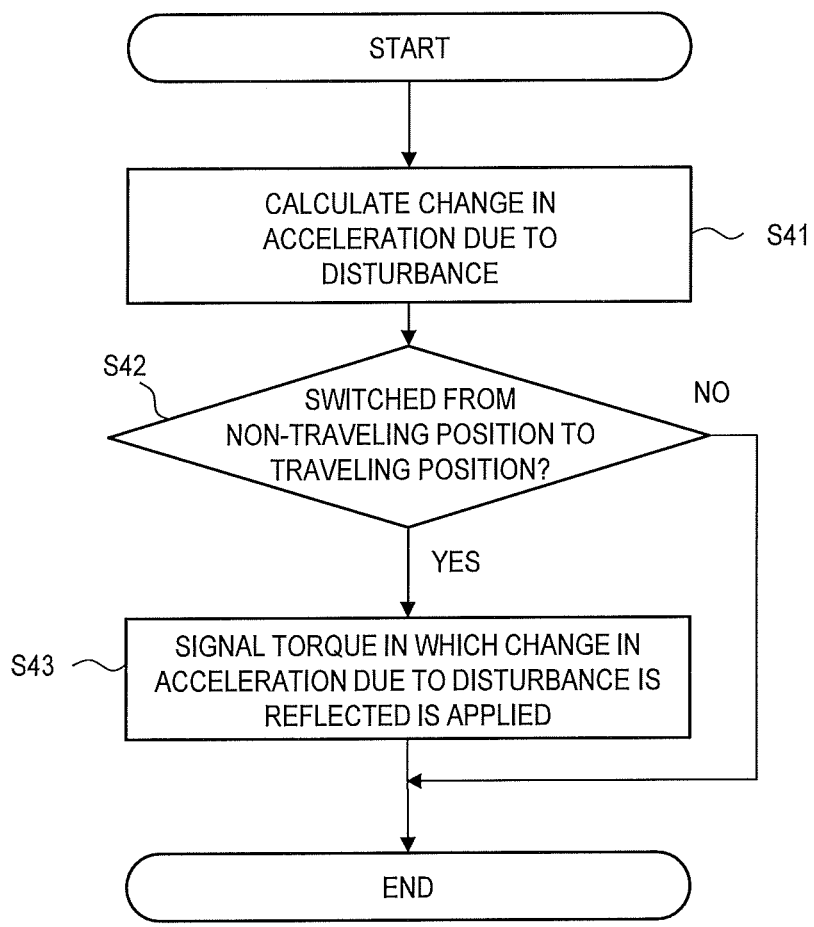
FIG. 9 is a flowchart for describing an example (a fourth embodiment) of control performed by the controller of the electric vehicle according to the present disclosure.
Figure 10:
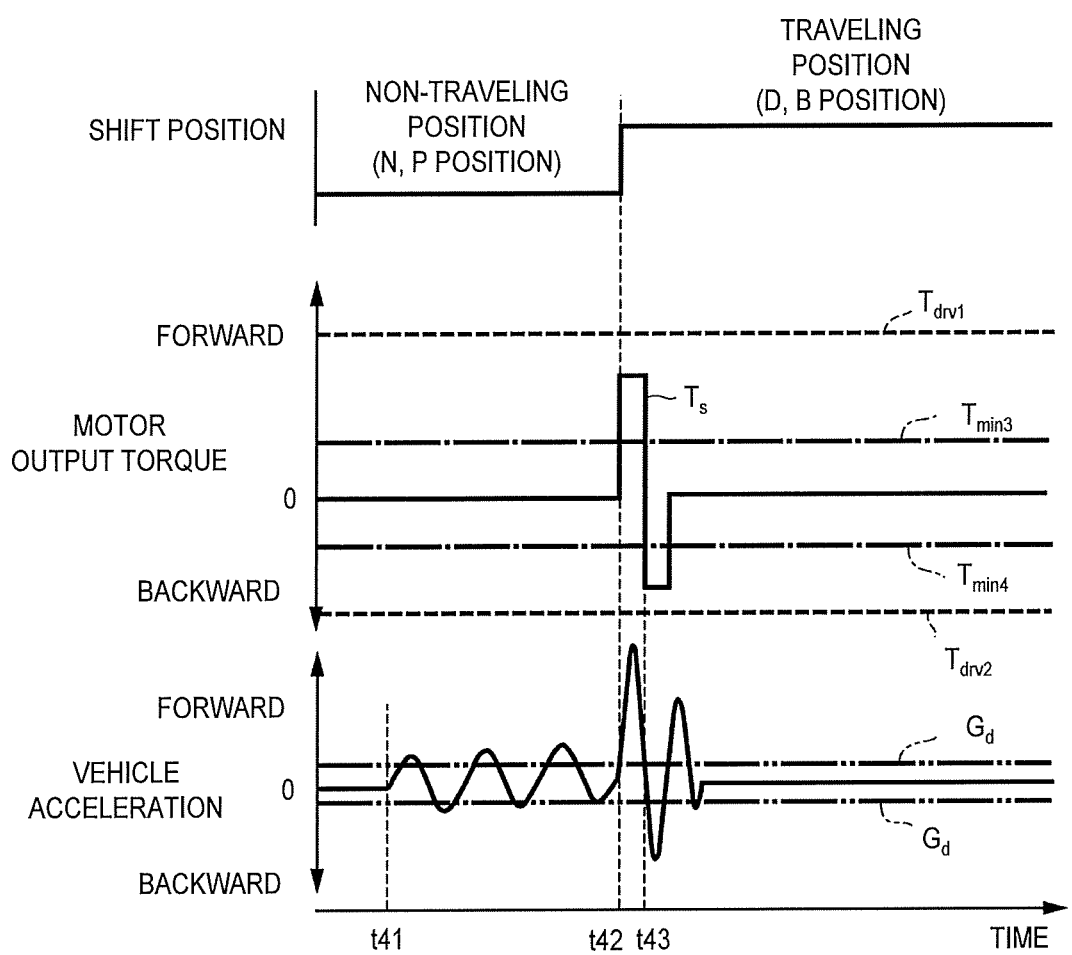
FIG. 10 illustrates time charts for describing a behavior of the vehicle when the control according to the fourth embodiment illustrated in the flowchart of FIG. 9 is performed.
Figure 11:
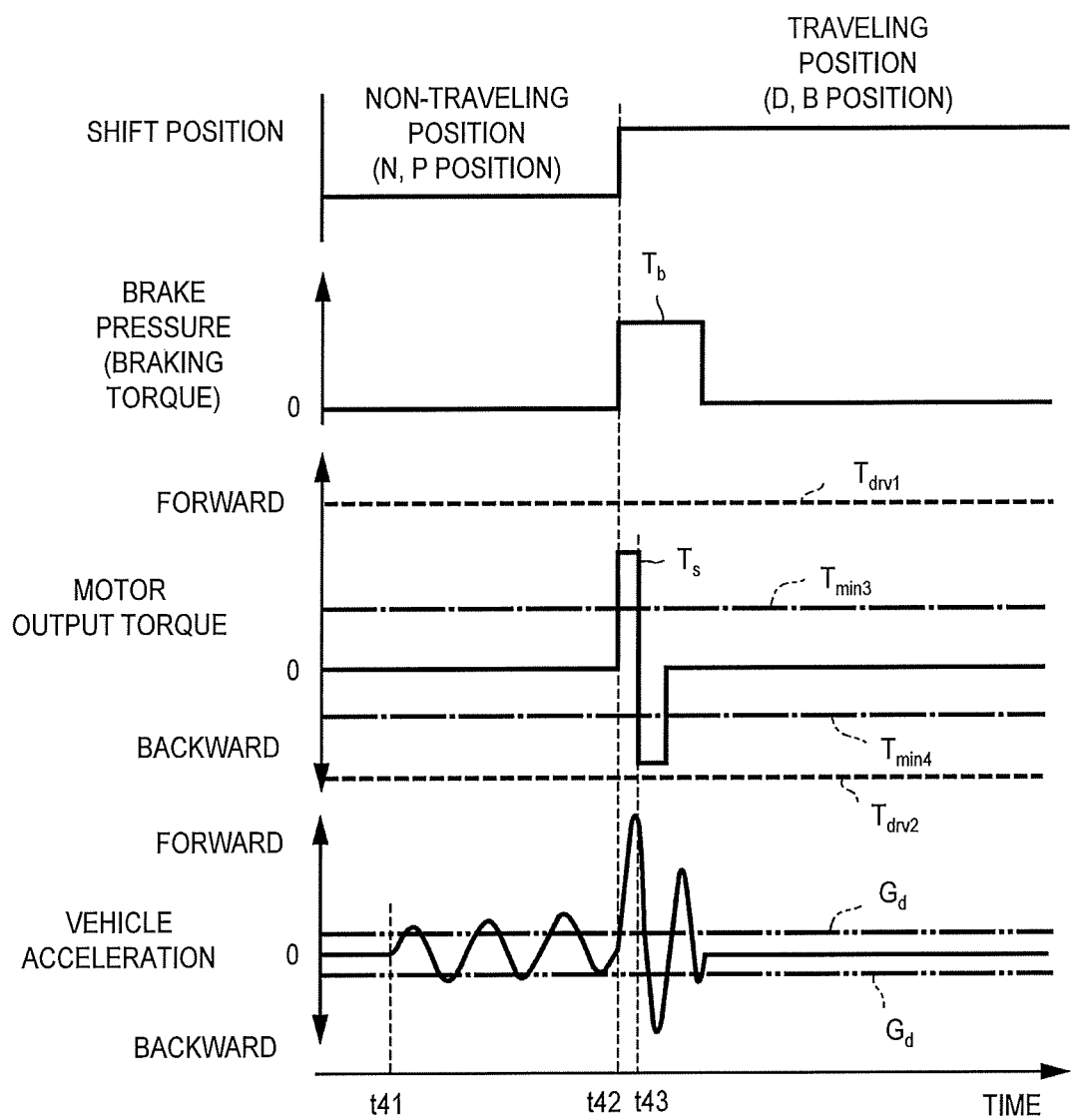
FIG. 11 is time charts for describing an example of derivative control according to the fourth embodiment illustrated in the flowchart of FIG. 9 and the time charts of FIG. 10.

A flowchart of FIG. 9 and time charts of FIGS. 10 and 11 illustrate a fourth embodiment of the control performed by the controller 6. In the flowchart of FIG. 9 in the fourth embodiment, first, in step S41, a change in acceleration of the vehicle $V_e$ due to a disturbance is calculated. Specifically, the disturbance acting on the vehicle $V_e$ is calculated based on the detection value of the acceleration sensor 5f. For example, as illustrated in the period from time t41 to time t42 in the time charts of FIG. 10, when acceleration (that is, disturbance acceleration) exceeding predetermined acceleration $G_d$ is detected in the stopped vehicle $V_e$, it is determined that a disturbance that cannot be ignored is acting on the vehicle $V_e$, and the disturbance is reflected in the output of the signal torque $T_s$ to be described below. The acceleration $G_d$ is a threshold value for determining whether the disturbance acting on the vehicle $V_e$ influences the control, and is set in advance based on, for example, the results of a traveling experiment or a simulation.

Subsequently, in step S42, it is determined whether the shift position of the shifting device 3 has been switched from the non-traveling position to the traveling position by the driver. For example, it is determined whether the shift position has been switched from the N position to the D position, the B position, or the R position. Alternatively, it is determined whether the shift position has been switched from the P position to the D position, the B position, or the R position.

When the determination in step S41 is negative because the shift position has not yet been switched from the non-traveling position to the traveling position, a routine illustrated in the flowchart of FIG. 9 ends without performing the subsequent control. Conversely, when the determination in step S41 is affirmative because the shift position has been switched from the non-traveling position to the traveling position, the process proceeds to step S43.

In step S43, the signal torque in which the change in the acceleration due to disturbance is reflected is applied. For example, as illustrated in the time charts of FIG. 10, when the shift position is switched from the non-traveling position to the traveling position at time t42, the signal torque $T_s$ is output from the motor 1 in conjunction therewith. In the example illustrated in FIG. 10, the shift position is switched from the non-traveling position to the traveling position in the forward direction, which is the D position or the B position. Therefore, in this case, first, the signal torque $T_s$ in the same direction as the rotational direction of the driving torque that causes the vehicle $V_e$ to travel in the forward direction is output. As a result, acceleration in the direction of accelerating the vehicle $V_e$ in the forward direction is generated. In this case, the change in the acceleration becomes the change in the vehicle behavior or the vibration accompanied with switching of the shift position, so that the driver senses such change in the vehicle behavior or the vibration when the shift position is switched as described above.

In a manner similar to that in the other embodiments described above, the signal torque $T_s$ generates the change in the vehicle behavior that the driver can sense while maintaining the stopped state of the vehicle $V_e$. However, in the fourth embodiment, as illustrated in the time charts of FIG. 10, the signal torque $T_s$ is smaller than the torque $T_{drv1}$ required for the vehicle $V_e$ to start to move in the forward direction, and larger than the minimum torque $T_{min3}$ at which the driver can recognize the change in the vehicle behavior. In the fourth embodiment, as described above, the signal torque $T_s$ is output in consideration of an influence of the disturbance acting on the vehicle $V_e$. Therefore, in the fourth embodiment, the torque $T_{min3}$ in which influence of the disturbance acceleration is reflected, and is set to a value larger than the normal torque $T_{min1}$ in which the disturbance is not reflected.

Accordingly, in step S43, when the disturbance acceleration due to the disturbance applied to the vehicle $V_e$ occurs before the shift position is switched from the non-traveling position to the traveling position, the motor 1 is controlled such that the motor 1 outputs the signal torque $T_s$ that generates acceleration larger than the disturbance acceleration.

Further, in the example illustrated in FIG. 10, as described above, after the influence of the disturbance acceleration is reflected and the signal torque $T_s$ in the same direction as the rotational direction of the driving torque that causes the vehicle $V_e$ to travel in the forward direction is output, the signal torque $T_s$ in the same direction as the rotational direction of the driving torque that causes the vehicle $V_e$ to travel in the backward direction is output at time t43. In other words, the motor 1 is controlled such that the motor 1 outputs the signal torque $T_s$ in the same direction as the rotational direction of the driving torque that drives the vehicle $V_e$ in the traveling position as described above, and then outputs the signal torque $T_s$ in the direction opposite to the rotational direction of the driving torque. As illustrated in the time charts of FIG. 10, in this case, the signal torque $T_s$ is smaller than the torque $T_{drv2}$ required for the vehicle $V_e$ to start to move in the backward direction, and larger than the minimum torque $T_{min4}$ at which the driver can recognize the change in the vehicle behavior. Similar to the torque $T_{min3}$, in this case, the torque $T_{min4}$ in which influence of the disturbance acceleration is reflected, and is set to a value larger than the normal torque $T_{min2}$ in which the disturbance is not reflected. Therefore, the signal torque $T_s$ generates the change in the vehicle behavior that the driver can sense while maintaining the stopped state of the vehicle $V_e$, and generates acceleration larger than the disturbance acceleration.

In step S43, when the signal torque $T_s$ is applied, the routine illustrated in the flowchart of FIG. 9 ends.

As described above, in the fourth embodiment, in a case where a disturbance is applied to the vehicle $V_e$, for example, when the vehicle $V_e$ is stopped on a vibrating bridge or is stopped by being exposed to a strong wind, signal torque $T_s$ that is larger than that in the normal time without a disturbance is output such that acceleration exceeding the disturbance acceleration occurring to the vehicle $V_e$ due to the disturbance is generated. Therefore, it is possible to enable the driver to surely sense the change in the vehicle behavior or the vibration using the signal torque $T_s$ output from the motor 1 even when the disturbance as described above occurs when the driver switches the shift position.

Moreover, in the fourth embodiment, along with outputting the signal torque $T_s$ in which the disturbance acceleration is reflected as described above, the braking torque $T_b$ (braking force) may be generated by operating the brake device 4. For example, as illustrated in time charts of FIG. 11, at time t42, the signal torque $T_s$ is output, and the brake device 4 is simultaneously operated by increasing brake pressure acting on the brake device 4. The braking torque $T_b$ generated in this case has an absolute value larger than the signal torque $T_s$ in which the influence of the disturbance acceleration is reflected, and which is output from the motor 1 while the vehicle $V_e$ is in the stopped state. Therefore, even when the vehicle $V_e$ outputs the signal torque $T_s$ in which the influence of the disturbance acceleration is reflected, and which is larger than normal signal torque $T_s$, it is possible to maintain the stopped state of the vehicle $V_e$ using the braking torque $T_b$ generated by the brake device 4.

Fifth Embodiment

Figure 12:
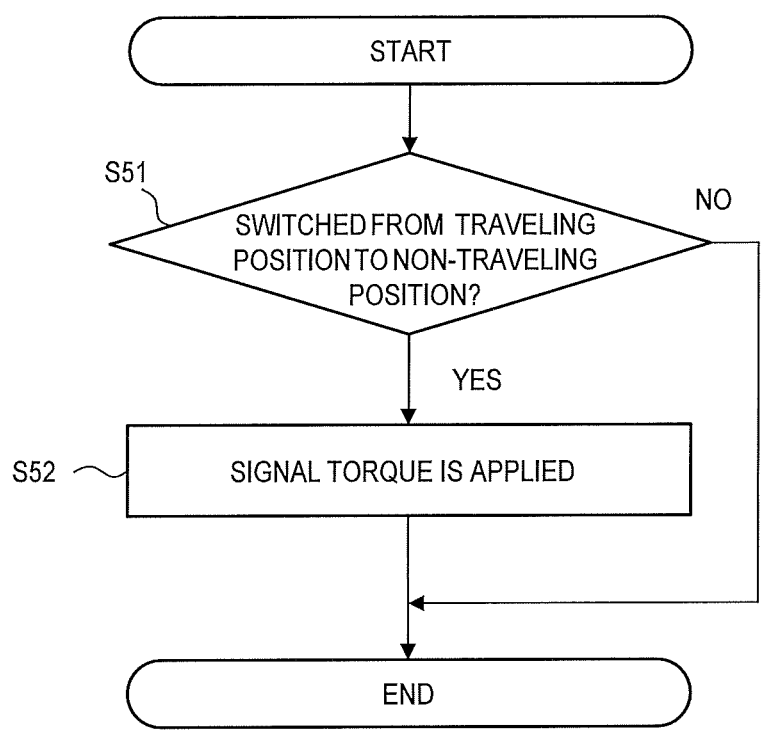
FIG. 12 is a flowchart for describing an example (a fifth embodiment) of control performed by the controller of the electric vehicle according to the present disclosure.
Figure 13:
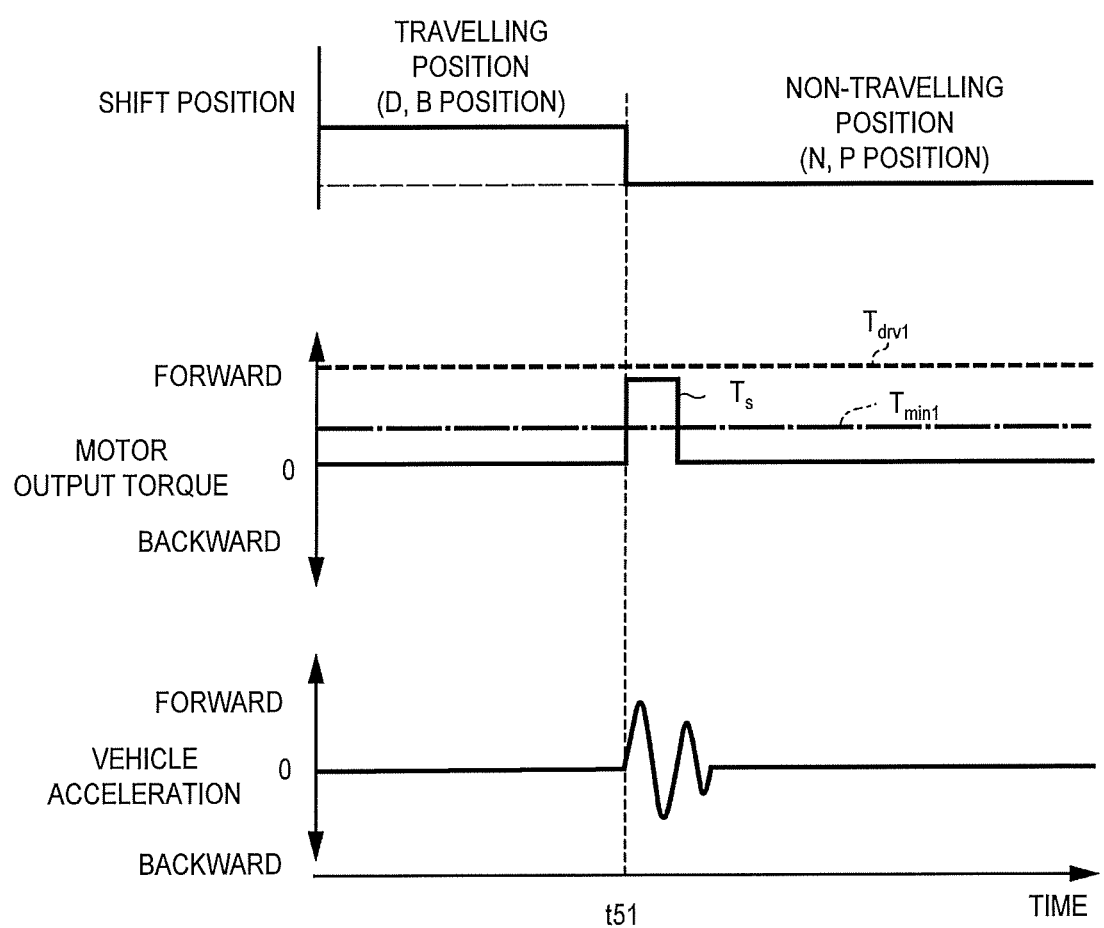
FIG. 13 illustrates time charts for describing a behavior of the vehicle when the control according to the fifth embodiment illustrated in the flowchart of FIG. 12 is performed.

A flowchart of FIG. 12 and time charts of FIG. 13 illustrate a fifth embodiment of the control performed by the controller 6. In the fifth embodiment, in the flowchart of FIG. 12, first, in step S51, it is determined whether the shift position of the shifting device 3 has been switched from the traveling position to the non-traveling position by the driver. For example, it is determined whether the shift position has been switched from the D position, the B position, or the R position to the N position or the P position.

When the determination in step S51 is negative because the shift position has not yet been switched from the traveling position to the non-traveling position, a routine illustrated in the flowchart of FIG. 12 ends without performing the subsequent control. Conversely, when the determination in step S51 is affirmative because the shift position has been switched from the traveling position to the non-traveling position, the process proceeds to step S52.

In step S52, the signal torque is applied. For example, as illustrated in the time charts of FIG. 13, when the shift position is switched from the traveling position to the non-traveling position at time t51, the signal torque $T_s$ is output from the motor 1 in conjunction therewith. In the example illustrated in FIG. 13, the signal torque $T_s$ in the same direction as the rotational direction of the driving torque that causes the vehicle $V_e$ to travel in the forward direction is output. As a result, acceleration in the direction of accelerating the vehicle $V_e$ in the forward direction is generated. In this case, the change in the acceleration becomes the change in the vehicle behavior or the vibration accompanied with switching of the shift position so that the driver can sense such change in the vehicle behavior or the vibration when the shift position is switched as described above.

As illustrated in the time charts of FIG. 13, the signal torque $T_s$ is smaller than the torque $T_{drv1}$ required for the vehicle $V_e$ to start to move in the forward direction, and larger than the minimum torque $T_{min1}$ at which the driver can recognize the change in the vehicle behavior. In other words, the signal torque $T_s$ generates the change in the vehicle behavior that the driver can sense while maintaining the stopped state or the traveling state of the vehicle $V_e$. For example, when the signal torque $T_s$ as described above is applied while the vehicle $V_e$ is in the stopped state, it is possible to enable the driver to sense the change in the vehicle behavior or the vibration accompanied with switching of the shift position without starting the vehicle $V_e$ (that is, while maintaining the stopped state of the vehicle $V_e$). Further, when the signal torque $T_s$ as described above is applied while the vehicle $V_e$ is in a state of traveling at a given speed, it is possible to enable the driver to sense the change in the vehicle behavior or the vibration accompanied with switching of the shift position without accelerating or decelerating the vehicle $V_e$ (that is, while maintaining the traveling state of the vehicle $V_e$). Alternatively, when the signal torque $T_s$ as described above is applied while the vehicle $V_e$ is in a state of accelerating in constant acceleration, or while the vehicle $V_e$ is in a state of decelerating in constant deceleration, it is possible to enable the driver to sense the change in the vehicle behavior or the vibration accompanied with switching of the shift position, without unnecessarily changing acceleration or deceleration of the vehicle $V_e$ (that is, while maintaining the traveling state of the vehicle $V_e$). Alternatively, when the signal torque $T_s$ as described above is applied while the driver does not especially perform an accelerating operation or a braking operation and the vehicle $V_e$ is in a state of coasting, it is possible to enable the driver to sense the change in the vehicle behavior or the vibration accompanied with switching of the shift position, without unnaturally accelerating or decelerating the vehicle $V_e$ (that is, while maintaining the traveling state of the vehicle $V_e$).

In step S52, when the signal torque $T_s$ is applied, the routine illustrated in the flowchart of FIG. 12 ends.

As described above, in the fifth embodiment, when the driver switches the shift position from the traveling position, such as the D position and the B position, to the non-traveling position, such as the N position and the P position, it is possible to enable the driver to sense the change in the vehicle behavior or the vibration using the signal torque $T_s$ output from the motor 1. For example, when the driver selects the N position during traveling of the vehicle $V_e$ and causes the vehicle $V_e$ to coast, the driver can sense and recognize that the shift position has been switched from the traveling position to the N position. Therefore, the driver can appropriately switch the shift position, feeling as if the driver is driving a conventional vehicle.

Figure 14:
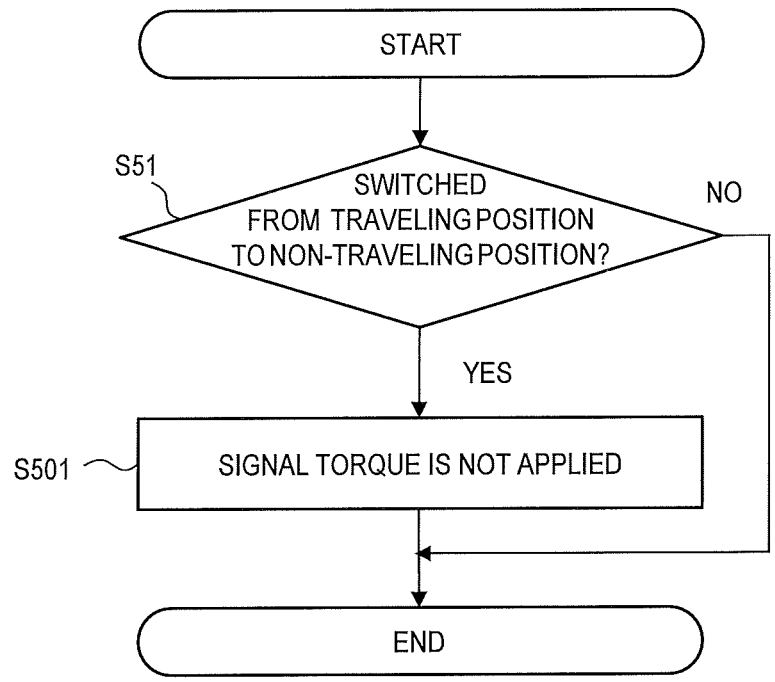
FIG. 14 is a flowchart for describing an example of derivative control according to the fifth embodiment illustrated in the flowchart of FIG. 12 and the time charts of FIG. 13.

Moreover, the control described in the fifth embodiment may be performed in a state, for example, where the vehicle $V_e$ is stopped on a flat road. In other words, the control may be performed when the driver switches the shift position from the traveling position to the non-traveling position while stopping. However, in this case, when the signal torque $T_s$ for enabling the driver to sense the change in the vehicle behavior or the vibration is applied even though the shift position is shifted to the non-traveling position where no driving force is generated, some drivers may feel uncomfortable. Therefore, for example, the control can be performed as illustrated in the flowchart of FIG. 14. In the flowchart of FIG. 14, the same step numbers as the flowchart of FIG. 12 are given to the same steps as the control content illustrated in the flowchart of FIG. 12.

Specifically, in the flowchart of FIG. 14, when the determination in step S51 is affirmative because the shift position has been switched from the traveling position to non-the traveling position (the N position or the P position), the process proceeds to step S501.

In step S501, the signal torque is not applied. In other words, in this case, the routine illustrated in the flowchart of FIG. 14 ends without performing the subsequent control. Moreover, as in the control example illustrated in the flowchart of FIG. 4 described above, the vehicle speed at the time of switching of the shift position may be detected, and it may be determined whether to apply the signal torque $T_s$ based on the vehicle speed. For example, in a case where the vehicle speed when the driver switches the shift position from the traveling position to the non-traveling position is lower than a predetermined vehicle speed, the motor 1 may be controlled so that the motor 1 does not apply the signal torque $T_s$ as described above.

As such, when the shift position is switched while stopping, it is possible to avoid a situation where the driver feels uncomfortable by determining whether to apply the signal torque $T_s$ in consideration of the vehicle speed at the time of switching of the shift position.

Sixth Embodiment

Figure 15:
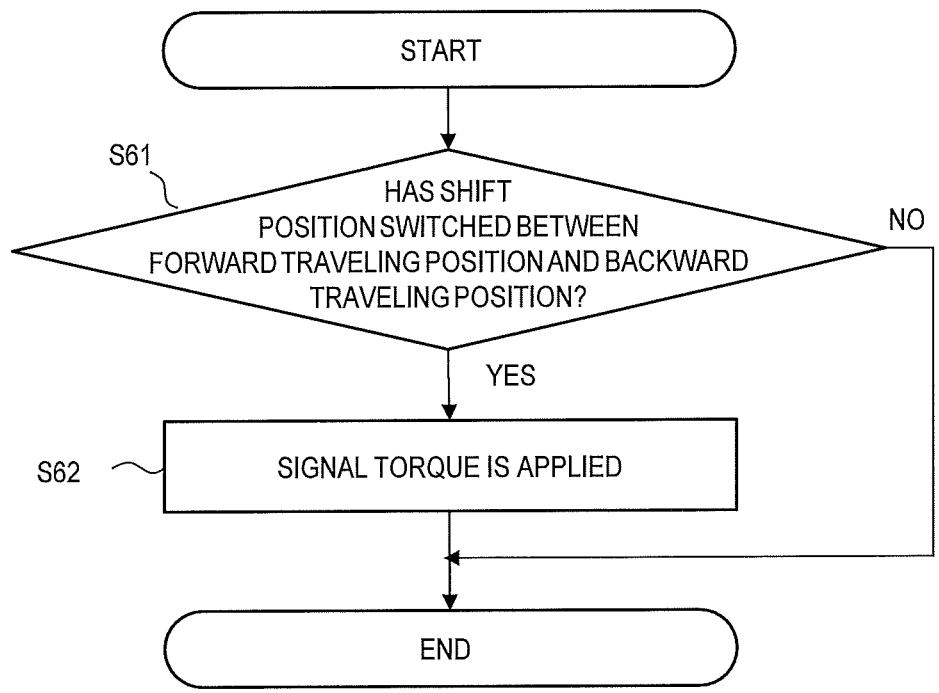
FIG. 15 is a flowchart for describing an example (a sixth embodiment) of control performed by the controller of the electric vehicle according to the present disclosure.
Figure 16:
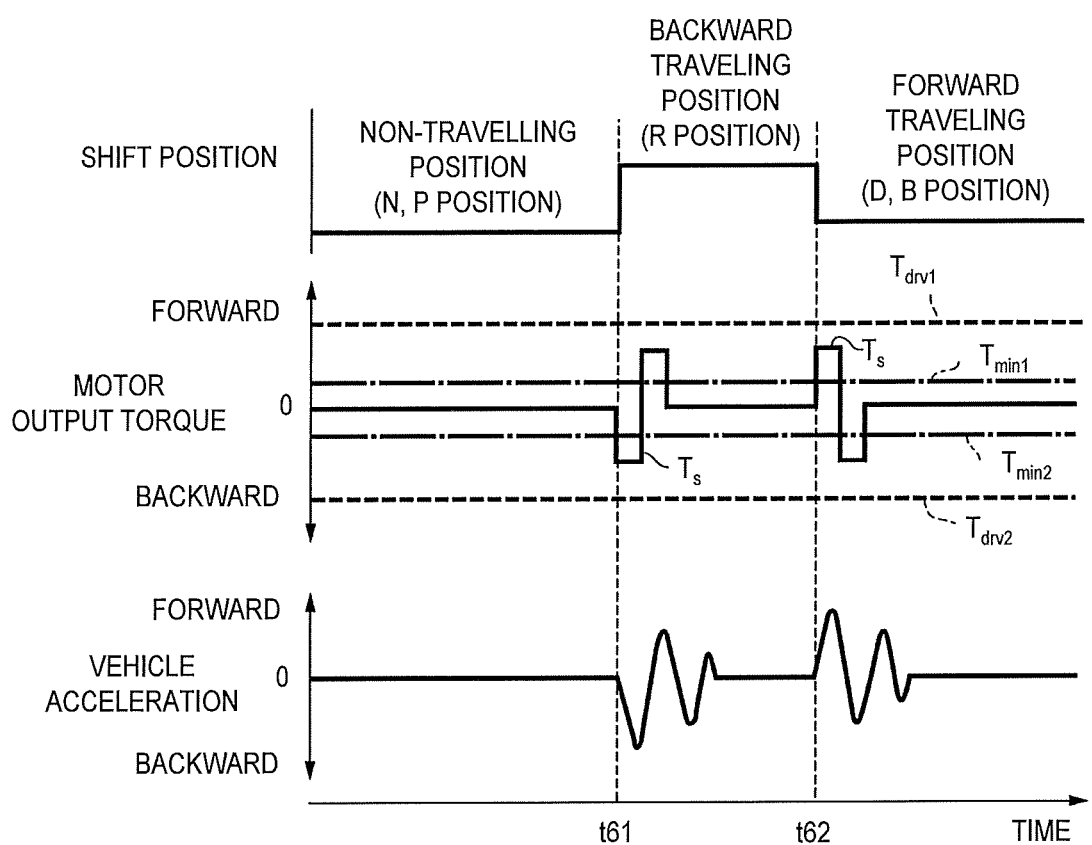
FIG. 16 illustrates time charts for describing a behavior of the vehicle when the control according to the sixth embodiment illustrated in the flowchart of FIG. 15 is performed.

A flowchart of FIG. 15 and time charts of FIG. 16 illustrate a sixth embodiment of the control performed by the controller 6. In the sixth embodiment, in the flowchart of FIG. 15, first, in step S61, it is determined whether the shift position of the shifting device 3 has been switched between the traveling position in the forward direction and the traveling position in the backward position by the driver. In other words, it is determined whether the shift position has been switched from the D position or the B position to the R position, or from the R position to the D position or the B position.

When the determination in step S61 is negative because the shift position has not yet been switched between the traveling position in the forward direction and the traveling position in the backward direction, a routine illustrated in the flowchart of FIG. 15 ends without performing the subsequent control. Conversely, when the determination in step S61 is affirmative because the shift position has been switched between the traveling position in the forward direction and the traveling position in the backward direction, for example, the shift position has been switched from the D position or the B position to the R position, the process proceeds to step S62.

In step S62, the signal torque is applied. For example, as illustrated in the time charts of FIG. 16, when the shift position is switched from the D position or the B position to the R position at time t61, the signal torque $T_s$ is output from the motor 1 in conjunction therewith. In the example illustrated in FIG. 16, the signal torque $T_s$ in the same direction as the rotational direction of the driving torque that causes the vehicle $V_e$ to travel in the backward direction is output when the gear position is switched to the R position. As a result, acceleration in the direction of accelerating the vehicle $V_e$ in the backward direction is generated. In this case, the change in the acceleration becomes the change in the vehicle behavior or the vibration accompanied with switching of the shift position so that the driver senses such change in the vehicle behavior or the vibration when the shift position is switched as described above.

Further, in the sixth embodiment, when the shift position is switched from the R position to the D position or the B position as well, the signal torque $T_s$ is output from the motor 1 in conjunction therewith. For example, as illustrated in the time charts in FIG. 16 when the shift position is switched to the D position or the B position in the forward direction at time t62, the signal torque $T_s$ in the same direction as the rotational direction of the driving torque that causes the vehicle $V_e$ to travel in the forward direction is output from the motor 1 in conjunction therewith. As a result, acceleration in the direction of accelerating the vehicle $V_e$ in the forward direction is generated. In this case, the change in the acceleration becomes the change in the vehicle behavior or the vibration accompanied with switching of the shift position so that the driver senses such change in the vehicle behavior or the vibration when the shift position is switched as described above.

In step S62, when the signal torque $T_s$ is applied, the routine illustrated in the flowchart of FIG. 15 ends.

As described above, in the sixth embodiment, when the driver switches the shift position between, for example, the traveling position, such as the D position and the B position, which moves the vehicle $V_e$ forward, and the traveling position, such as the R position, which moves the vehicle $V_e$ backward, it is possible to enable the driver to sense the change in the vehicle behavior or the vibration using the signal torque $T_s$ output from the motor 1. In this case, the motor 1 is controlled such that the motor 1 outputs the signal torque $T_s$ in the same direction as the rotational direction of the driving torque that causes the vehicle $V_e$ to travel. For example, when the shift position is switched to the D position, the signal torque $T_s$ in the rotational direction that moves the vehicle $V_e$ forward is output. On the other hand, when the shift position is switched to the R position, the signal torque $T_s$ in the rotational direction that moves the vehicle $V_e$ backward is output. As such, the driver can sense and recognize the future traveling direction when selecting the traveling position and causing the vehicle $V_e$ to travel. Therefore, the driver can appropriately switch the shift position, feeling closer to driving a conventional vehicle without feeling uncomfortable or uneasy.

Seventh Embodiment

Figure 17:
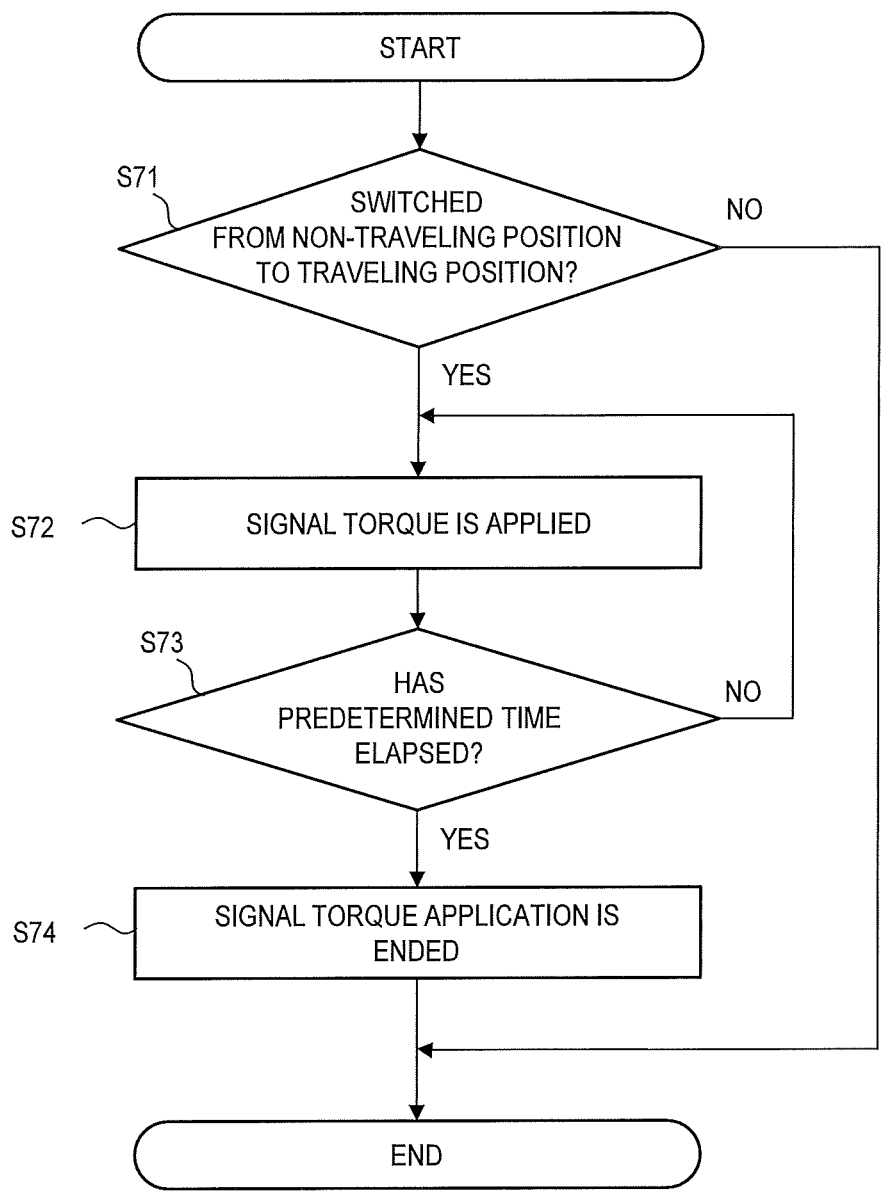
FIG. 17 is a flowchart for describing an example (a seventh embodiment) of control performed by the controller of the electric vehicle according to the present disclosure.
Figure 18:
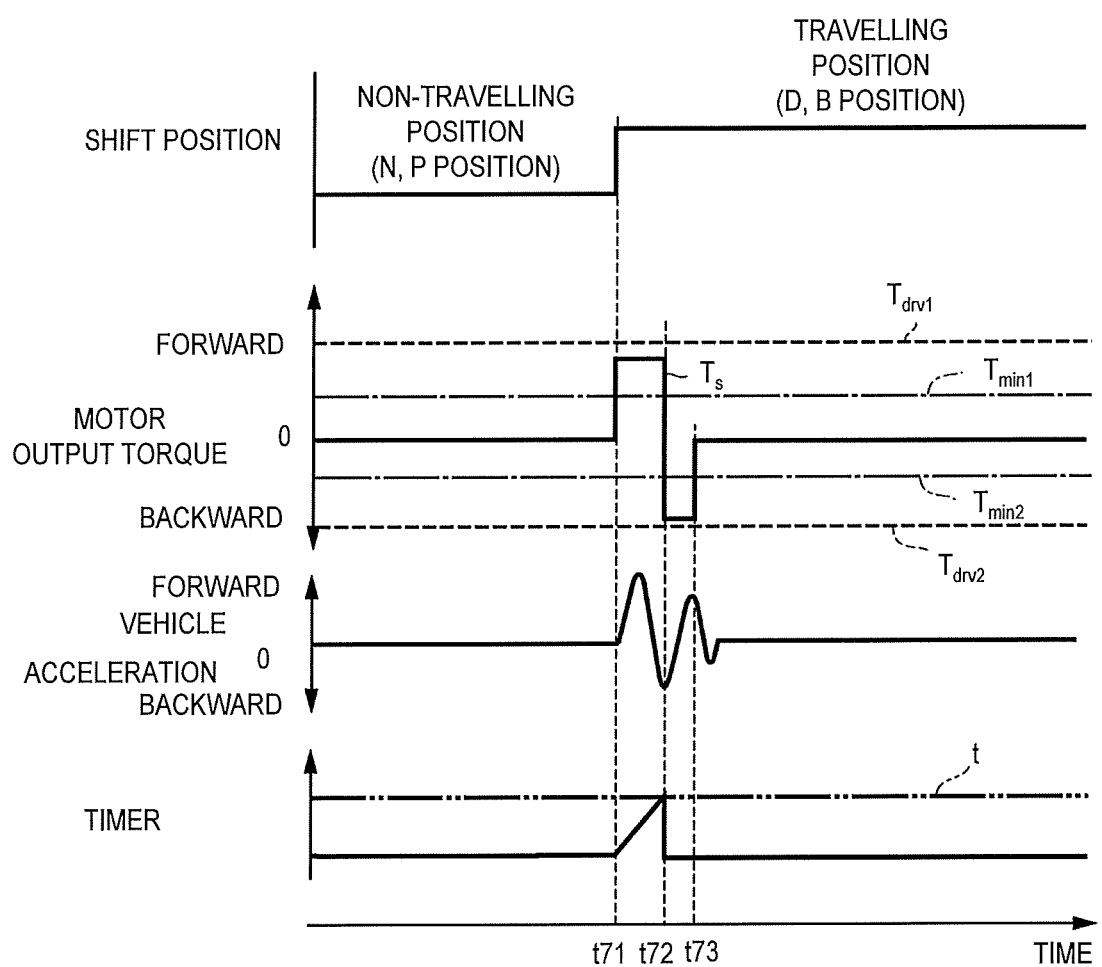
FIG. 18 illustrates time charts for describing a behavior of the vehicle when the control according to the seventh embodiment illustrated in the flowchart of FIG. 17 is performed.

A flowchart of FIG. 17 and time charts of FIG. 18 illustrate a seventh embodiment of the control performed by the controller 6. In the seventh embodiment, in the flowchart of FIG. 17, first, in step S71, it is determined whether the shift position of the shifting device 3 has been switched from the non-traveling position to the traveling position by the driver. For example, it is determined whether the shift position has been switched from the N position to the D position, the B position, or the R position. Alternatively, it is determined whether the shift position has been switched from the P position to the D position, the B position, or the R position.

When the determination in step S71 is negative because the shift position has not yet been switched from the non-traveling position to the traveling position, a routine illustrated in the flowchart of FIG. 17 ends without performing the subsequent control. Conversely, when the determination in step S71 is affirmative because the shift position has been switched from the non-traveling position to the traveling position, the process proceeds to step S72.

In step S72, the signal torque is applied. Specifically, the motor 1 is controlled such that the motor 1 outputs the driving torque as the signal torque. For example, as illustrated in the time charts of FIG. 18, when the shift position is switched from the non-traveling position to the traveling position at time t71, the signal torque $T_s$ is output from the motor 1 in conjunction therewith. In the example illustrated in FIG. 18, the shift position is switched from the non-traveling position to the traveling position in the forward direction, which is the D position or the B position. Therefore, in this case, first, the signal torque $T_s$ in the same direction as the rotational direction of the driving torque that causes the vehicle $V_e$ to travel in the forward direction is output. As a result, acceleration in the direction of accelerating the vehicle $V_e$ in the forward direction is generated. In this case, the change in the acceleration becomes the change in the vehicle behavior or the vibration accompanied with switching of the shift position so that the driver senses such change in the vehicle behavior or the vibration when the shift position is switched as described above.

As illustrated in the time charts of FIG. 18, the signal torque $T_s$ is smaller than the torque $T_{drv1}$ required for the vehicle $V_e$ to start to move in the forward direction, and larger than the minimum torque $T_{min1}$ at which the driver can recognize the change in the vehicle behavior. In other words, the signal torque $T_s$ generates the change in the vehicle behavior that the driver can sense while maintaining the stopped state of the vehicle $V_e$.

Further, in the example illustrated in FIG. 18, after the signal torque $T_s$ in the same direction as the rotational direction of the driving torque that causes the vehicle $V_e$ to travel in the forward direction is output, the signal torque $T_s$ in the same direction as the rotational direction of the driving torque that causes the vehicle $V_e$ to travel in the backward direction is output later at time t72. In other words, the motor 1 is controlled such that the motor 1 outputs the signal torque $T_s$ in the same direction as the rotational direction of the driving torque that drives the vehicle $V_e$ in the traveling position as described above, and then outputs the signal torque $T_s$ in the direction opposite to the rotational direction of the driving torque. As illustrated in the time charts of FIG. 18, in this case, the signal torque $T_s$ is smaller than the torque $T_{drv2}$ required for the vehicle $V_e$ to start to move in the backward direction, and larger than the minimum torque $T_{min2}$ at which the driver can recognize the change in the vehicle behavior. In summary, the signal torque $T_s$ generates the change in the vehicle behavior that the driver can sense while maintaining the stopped state of the vehicle $V_e$.

Subsequently, in step S73, it is determined whether a predetermined time t has elapsed after the output of the signal torque $T_s$ is started. Specifically, as illustrated in the time charts of FIG. 18, the shift position is switched by the driver, and at the same time, a timer is started at time t71 when the signal torque $T_s$ is output. Then, it is determined whether the elapsed time of the timer (not shown) has reached the predetermined time t. The predetermined time t is a time required for the signal torque $T_s$ to be output without excess or deficiency. For example, the predetermined time is the shortest time in which the driver can sense the change in the vehicle behavior or the vibration using the signal torque $T_s$, and is set in advance based on the results of a traveling experiment or a simulation.

When the determination is negative in step S73 because the predetermined time t has not yet elapsed after the output of the signal torque $T_s$ is started, the process returns to step S72, and the output of the signal torque $T_s$ from the motor 1 is continued. Conversely, when the determination in step S73 is affirmative because the predetermined time t has elapsed after the output of the signal torque $T_s$ is started, the process proceeds to step S74.

In step S74, the applying of the signal torque $T_s$ is ended. In other words, the output of the signal torque $T_s$ from the motor 1 is ended. In the example illustrated in FIG. 18, the elapsed time of the timer reaches the predetermined time t at time t72, and the output of the signal torque $T_s$ in the rotational direction that causes the vehicle $V_e$ to travel in the forward direction is ended at time t72. Thereafter, in a manner similar to that in the first embodiment described above, the signal torque $T_s$ in the rotational direction that causes the vehicle $V_e$ to travel in the backward direction is output from the time t72 to the time t73. In the embodiment of the present disclosure, as in the example illustrated in FIG. 18, the predetermined time t as described above may be set with respect to the signal torque $T_s$, which is in the same direction as the rotational direction of the driving torque, and which is output for the first time. Alternatively, the predetermined time t as described above may be set with respect to the signal torque $T_s$, which is in the same direction as the rotational direction of the driving torque, and which is output for the first time, and the signal torque $T_s$, which is in the direction opposite to the rotational direction of the driving torque, and which is subsequently output. Alternatively, another predetermined time separate from the predetermined time t as described above may be set with respect to the signal torque $T_s$, which is in the direction opposite to the rotational direction of the driving torque, and which is output later.

In step S74, when the applying of the signal torque $T_s$ is ended, the routine illustrated in the flowchart of FIG. 17 ends.

As described above, in the seventh embodiment, it is possible to cause the motor 1 to output the signal torque $T_s$ for enabling the driver to sense the change in the vehicle behavior or the vibration, only for a period of the predetermined time t. As such, it is possible to output the signal torque $T_s$ without excess or deficiency. Therefore, it is possible to reduce the power consumption of the motor 1 when outputting the signal torque $T_s$, and furthermore, to improve energy efficiency of the vehicle $V_e$.

Eighth Embodiment

Figure 19:
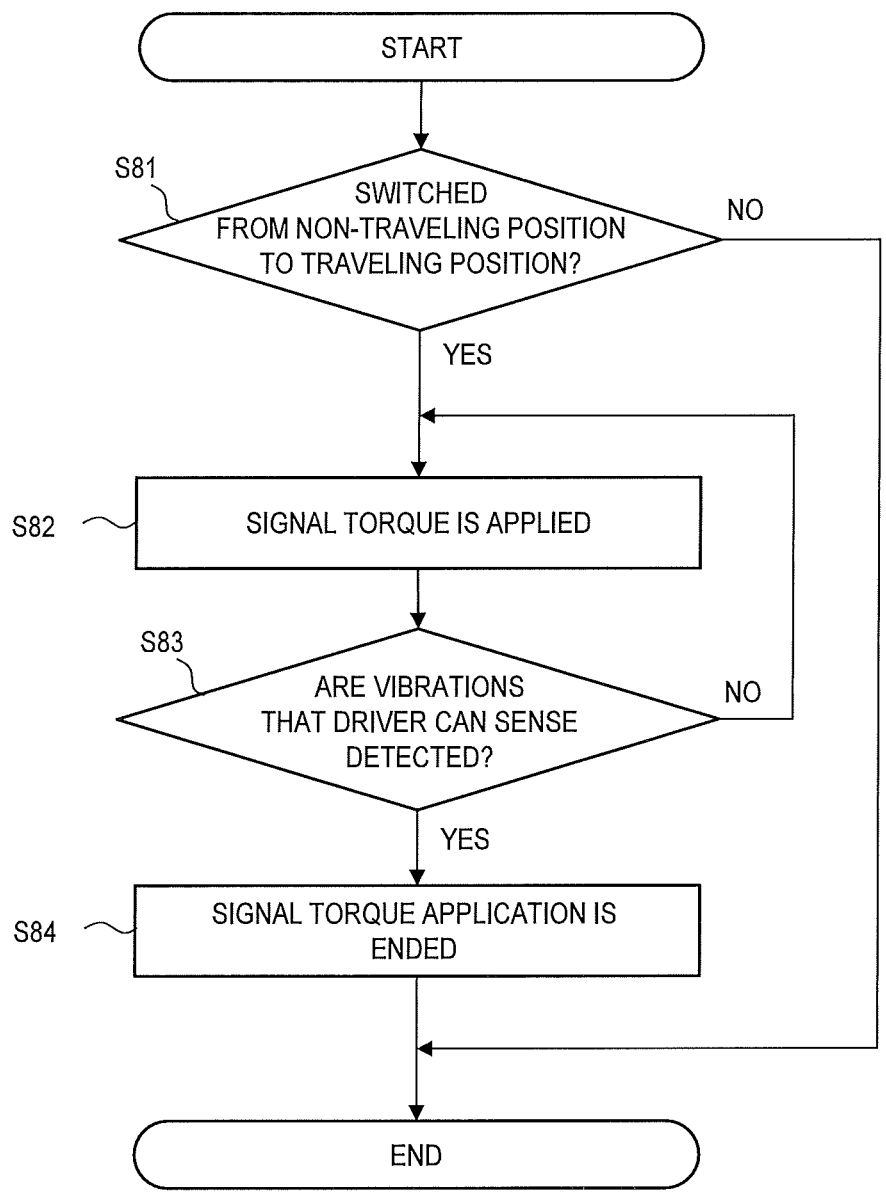
FIG. 19 is a flowchart for describing an example (an eighth embodiment) of control performed by the controller of the electric vehicle according to the present disclosure.
Figure 20:
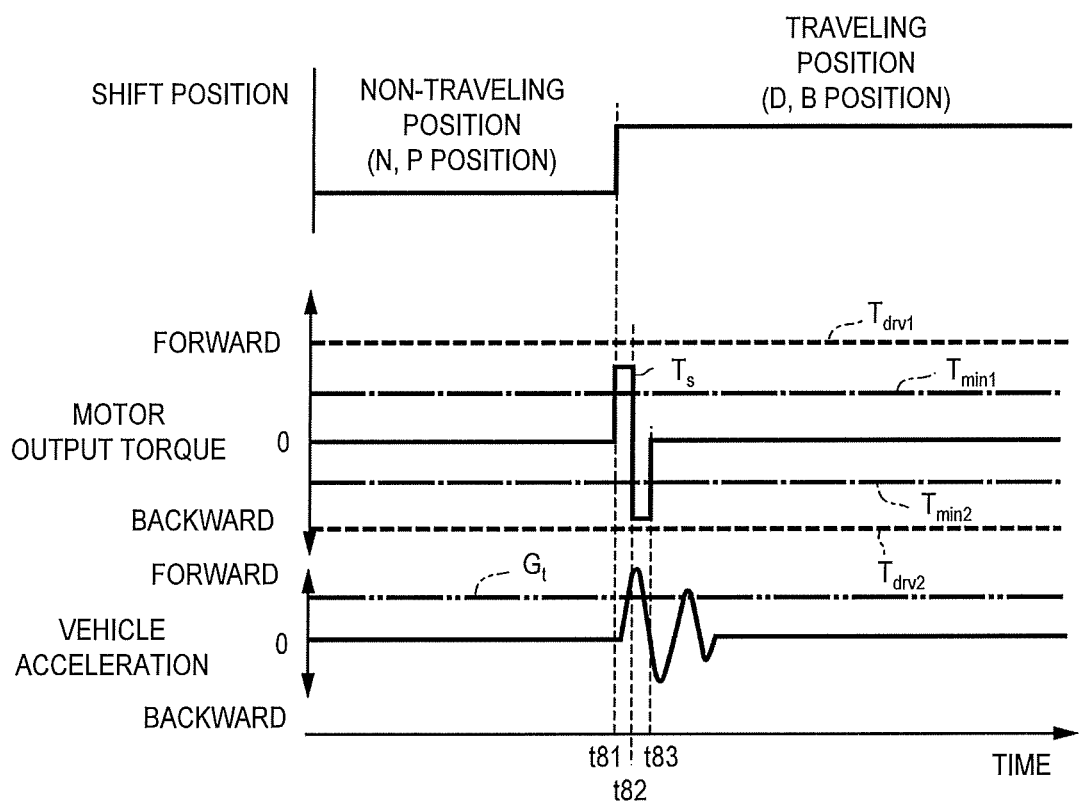
FIG. 20 illustrates time charts for describing a behavior of the vehicle when the control according to the eighth embodiment illustrated in the flowchart of FIG. 19 is performed.

A flowchart of FIG. 19 and time charts of FIG. 20 illustrate an eighth embodiment of the control performed by the controller 6. In the eighth embodiment, in the flowchart of FIG. 19, first, in step S81, it is determined whether the shift position of the shifting device 3 has been switched from the non-traveling position to the traveling position by the driver. For example, it is determined whether the shift position has been switched from the N position to the D position, the B position, or the R position. Alternatively, it is determined whether the shift position has been switched from the P position to the D position, the B position, or the R position.

When the determination in step S81 is negative because the shift position has not yet been switched from the non-traveling position to the traveling position, a routine illustrated in the flowchart of FIG. 19 ends without performing the subsequent control. Conversely, when the determination in step S81 is affirmative because the shift position has been switched from the non-traveling position to the traveling position, the process proceeds to step S82.

In step S82, the signal torque is applied. Specifically, the motor 1 is controlled such that the motor 1 outputs the driving torque as the signal torque. For example, as illustrated in the time charts of FIG. 20, when the shift position is switched from the non-traveling position to the traveling position at time t81, the signal torque $T_s$ is output from the motor 1 in conjunction therewith. In the example illustrated in FIG. 20, the shift position is switched from the non-traveling position to the traveling position in the forward direction, which is the D position or the B position. Therefore, in this case, first, the signal torque $T_s$ in the same direction as the rotational direction of the driving torque that causes the vehicle $V_e$ to travel in the forward direction is output. As a result, acceleration in the direction of accelerating the vehicle $V_e$ in the forward direction is generated. In this case, the change in the acceleration becomes the change in the vehicle behavior or the vibration accompanied with switching of the shift position so that the driver senses such change in the vehicle behavior or the vibration when the shift position is switched as described above.

As illustrated in the time charts of FIG. 20, the signal torque $T_s$ is smaller than the torque $T_{drv1}$ required for the vehicle $V_e$ to start to move in the forward direction, and larger than the minimum torque $T_{min1}$ at which the driver can recognize the change in the vehicle behavior. In other words, the signal torque $T_s$ generates the change in the vehicle behavior that the driver can sense while maintaining the stopped state of the vehicle $V_e$.

Further, in the example illustrated in FIG. 20, after the signal torque $T_s$ in the same direction as the rotational direction of the driving torque that causes the vehicle $V_e$ to travel in the forward direction is output, the signal torque $T_s$ in the same direction as the rotational direction of the driving torque that causes the vehicle $V_e$ to travel in the backward direction is output at time t82. In other words, the motor 1 is controlled such that the motor 1 outputs the signal torque $T_s$ in the same direction as the rotational direction of the driving torque that drives the vehicle $V_e$ in the traveling position as described above, and then outputs the signal torque $T_s$ in the direction opposite to the rotational direction of the driving torque. As illustrated in the time charts of FIG. 20, in this case, the signal torque $T_s$ is smaller than the torque $T_{drv2}$ required for the vehicle $V_e$ to start to move in the backward direction, and larger than the minimum torque $T_{min2}$ at which the driver can recognize the change in the vehicle behavior. In summary, the signal torque $T_s$ generates the change in the vehicle behavior that the driver can sense while maintaining the stopped state of the vehicle $V_e$.

Subsequently, in step S83, it is determined whether vibrations that the driver can sense are detected. Specifically, as illustrated in the time charts of FIG. 20, it is determined whether the acceleration of the vehicle $V_e$ greater than or equal to a predetermined acceleration $G_t$ is generated by the output of the signal torque $T_s$. In other words, after the output of the signal torque $T_s$ is started, it is determined whether the acceleration of the vehicle $V_e$ greater than or equal to the predetermined acceleration $G_t$ is detected by the sensor 5. The predetermined acceleration $G_t$ is a threshold value with respect to the acceleration of the vehicle $V_e$ required for outputting the signal torque $T_s$ without excess or deficiency. For example, the predetermined acceleration $G_t$ is the minimum acceleration at which the driver can sense the change in the vehicle behavior or the vibration using the signal torque $T_s$, and is set in advance based on, for example, the results of a traveling experiment or a simulation.

After the output of the signal torque $T_s$ is started, when the determination is negative in step S83 because the acceleration greater than or equal to the predetermined acceleration $G_t$ has not yet been detected, the process returns to step S82, and the output of the signal torque $T_s$ from the motor 1 is continued. Conversely, when the determination in step S83 is affirmative because the acceleration greater than or equal to the predetermined acceleration $G_t$ is detected, the process proceeds to step S84.

In step S84, the applying of the signal torque is ended. In other words, the output of the signal torque $T_s$ from the motor 1 is ended. In the example illustrated in FIG. 20, the acceleration greater than or equal to the predetermined acceleration $G_t$ is generated at time t82, and the output of the signal torque $T_s$ in the rotational direction that causes the vehicle $V_e$ to travel in the forward direction is ended at time t82. Thereafter, in a manner similar to that in the first embodiment described above, the signal torque $T_s$ in the rotational direction that causes the vehicle $V_e$ to travel in the backward direction is output from the time t82 to the time t83. In the embodiment of the present disclosure, as in the example illustrated in FIG. 20, the predetermined acceleration $G_t$ as described above may be set with respect to the acceleration generated by the signal torque $T_s$, which is in the same direction as the rotational direction of the driving torque, and which is output for the first time. Alternatively, the predetermined acceleration $G_t$ as described above may be set with respect to the acceleration generated by the signal torque $T_s$, which is in the same direction as the rotational direction of the driving torque, which is output for the first time and the acceleration generated by the signal torque $T_s$, which is in the direction opposite to the rotational direction of the driving torque, and which is subsequently output. Alternatively, another predetermined acceleration separate from the predetermined acceleration $G_t$ as described above may be set with respect to the acceleration generated by the signal torque $T_s$, which is in the direction opposite to the rotational direction of the driving torque, and which is output later.

In step S84, when the applying of the signal torque $T_s$ is ended, the routine illustrated in the flowchart of FIG. 19 ends.

As described above, in the eighth embodiment, it is possible to cause the motor 1 to output the signal torque $T_s$ for enabling the driver to sense the change in the vehicle behavior or the vibration, only in the necessary minimum magnitude and period. As such, it is possible to output the signal torque $T_s$ without excess or deficiency. Therefore, it is possible to reduce the power consumption of the motor 1 when outputting the signal torque $T_s$, and furthermore, to improve energy efficiency of the vehicle $V_e$.

As described above, in the control device of the electric vehicle according to the embodiments of the present disclosure, when the driver switches the shift position in the vehicle $V_e$ that does not output the creep torque, or a vehicle $V_e$ that performs the creeping-cut, the signal torque $T_s$ for enabling the driver to sense that the shift position has been switched is output. The output torque of the motor 1 is controlled such that the stopped state or the traveling state of the vehicle $V_e$ is not changed by the signal torque $T_s$, such that the change in the vehicle behavior or the vibration that the driver can sense via the signal torque $T_s$ is generated. As such, it is possible to enable the driver to sense the change in the vehicle behavior or the vibration using the signal torque $T_s$ output from the motor 1 when the driver switches the shift position. Therefore, even in the electric vehicle $V_e$ that does not output creep torque or the electric vehicle $V_e$ that performs the creeping-cut, the driver can appropriately switch the shift position, feeling as if the driver is driving the conventional vehicle without feeling uncomfortable or uneasy.

What is claimed is:

1. A control device of an electric vehicle including a driving force source having at least one motor, driving wheels, a shifting device operated by a driver, the shifting device being configured to selectively set one of two shift positions including a traveling position that causes the driving force source to generate a driving force by transmitting output torque of the driving force source to the driving wheels and a non-traveling position that does not generate the driving force, and a sensor configured to detect the shift position set by the shifting device, the control device comprising:
   a controller configured to control the driving force source according to the shift position detected by the sensor, wherein the controller is configured to, when the driver switches the shift position, cause the driving force source to output signal torque that enables the driver to sense a change in a vehicle behavior accompanied with switching of the shift position while the electric vehicle maintains a non-traveling state, and
   wherein the controller is configured to cause the driving force source to output the signal torque when the driver switches the shift position from the non-traveling position to the traveling position,
   the controller is further configured to cause the driving force source to output the signal torque in the same direction as a rotational direction of a driving torque that drives the electric vehicle in the traveling position after switching, and
   the controller is further configured to cause the driving force source to output the signal torque in a direction opposite to the rotational direction of the driving torque after causing the driving force source to output the signal torque in the same direction as the rotational direction of the driving torque.

2. A control device of an electric vehicle including a driving force source having at least one motor, driving wheels, a shifting device operated by a driver, the shifting device being configured to selectively set one of two shift positions including a traveling position that causes the driving force source to generate a driving force by transmitting output torque of the driving force source to the driving wheels and a non-traveling position that does not generate the driving force, and a sensor configured to detect the shift position set by the shifting device, the control device comprising:
   a controller configured to control the driving force source according to the shift position detected by the sensor, wherein the controller is configured to, when the driver switches the shift position, cause the driving force source to output signal torque having a predetermined duration that enables the driver to sense a change in a vehicle behavior accompanied with switching of the shift position, and
   wherein the controller is configured to cause the driving force source to output the signal torque when the driver switches the shift position from the non-traveling position to the traveling position,
   the controller is further configured to cause the driving force source to output the signal torque in the same direction as a rotational direction of a driving torque that drives the electric vehicle in the traveling position after switching, and
   the controller is further configured to cause the driving force source to output the signal torque in a direction opposite to the rotational direction of the driving torque after causing the driving force source to output the signal torque in the same direction as the rotational direction of the driving torque.

3. The control device of the electric vehicle according to claim 2, wherein the signal torque is the output torque of the driving force source that generates a vibration while maintaining a stopped state or a traveling state of the electric vehicle.

\* \* \* \* \*